United States Patent
Phillips et al.

(10) Patent No.: US 10,691,130 B2
(45) Date of Patent: Jun. 23, 2020

(54) GRIDLOCK SOLVER FOR MOTION PLANNING SYSTEM OF AN AUTONOMOUS VEHICLE

(71) Applicant: UATC, LLC, San Francisco, CA (US)

(72) Inventors: Michael Lee Phillips, Pittsburgh, PA (US); Somchaya Liemhetcharat, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 16/127,786

(22) Filed: Sep. 11, 2018

(65) Prior Publication Data

US 2019/0377351 A1    Dec. 12, 2019

Related U.S. Application Data

(60) Provisional application No. 62/681,482, filed on Jun. 6, 2018.

(51) Int. Cl.
| | |
|---|---|
| G05D 1/02 | (2020.01) |
| G01C 21/34 | (2006.01) |
| G05D 1/00 | (2006.01) |
| G01C 21/20 | (2006.01) |

(52) U.S. Cl.
CPC .......... *G05D 1/0214* (2013.01); *G01C 21/20* (2013.01); *G01C 21/3453* (2013.01); *G05D 1/0088* (2013.01); *G05D 2201/0213* (2013.01)

(58) Field of Classification Search
CPC .............. G05D 1/0214; G05D 1/0088; G05D 2201/0213; G01C 21/3453; G01C 21/20
See application file for complete search history.

(56) References Cited

U.S. PATENT DOCUMENTS

| | | | | |
|---|---|---|---|---|
| 8,718,861 | B1 * | 5/2014 | Montemerlo | ......... B60W 30/00 701/26 |
| 10,379,533 | B2 * | 8/2019 | Bier | ............. G01C 21/3492 |
| 2017/0168485 | A1 | 6/2017 | Berntorp et al. | |
| 2017/0192437 | A1 * | 7/2017 | Bier | ................. G05D 1/0287 |
| 2018/0105174 | A1 | 4/2018 | Russell et al. | |

FOREIGN PATENT DOCUMENTS

WO    WO2019/140367    7/2019

OTHER PUBLICATIONS

International Search Report and Written Opinion for Application No. PCT/US2019/035713, dated Sep. 16, 2019, 16 pages.

* cited by examiner

*Primary Examiner* — Tyler J Lee
(74) *Attorney, Agent, or Firm* — Dority & Manning, P.A.

(57) ABSTRACT

The present disclosure provides autonomous vehicle systems and methods that include or otherwise leverage a motion planning system that solves gridlock as part of determining a motion plan for an autonomous vehicle (AV). In particular, a scenario generator within a motion planning system can determine one or more keep clear areas associated with the lane sequence, each keep clear area indicative of a region along the nominal path in which gridlock prevention is desired. A gridlock constraint can be generated for each of the one or more keep clear areas, each constraint being defined as a constraint area in a multi-dimensional space. A low-cost trajectory path can be determined through a portion of the multi-dimensional space that minimizes exposure to the constraint areas and that is consistent with all constraints generated for the one or more objects of interest and the one or more keep clear areas.

19 Claims, 19 Drawing Sheets

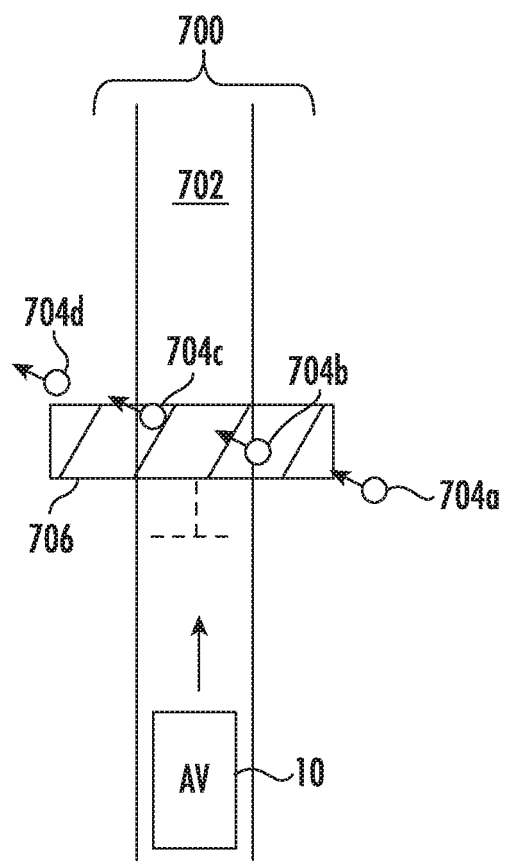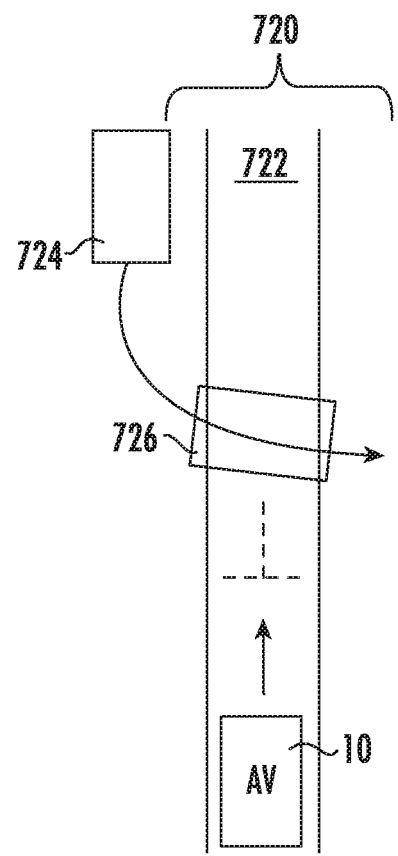
FIG. 7A
FIG. 7B

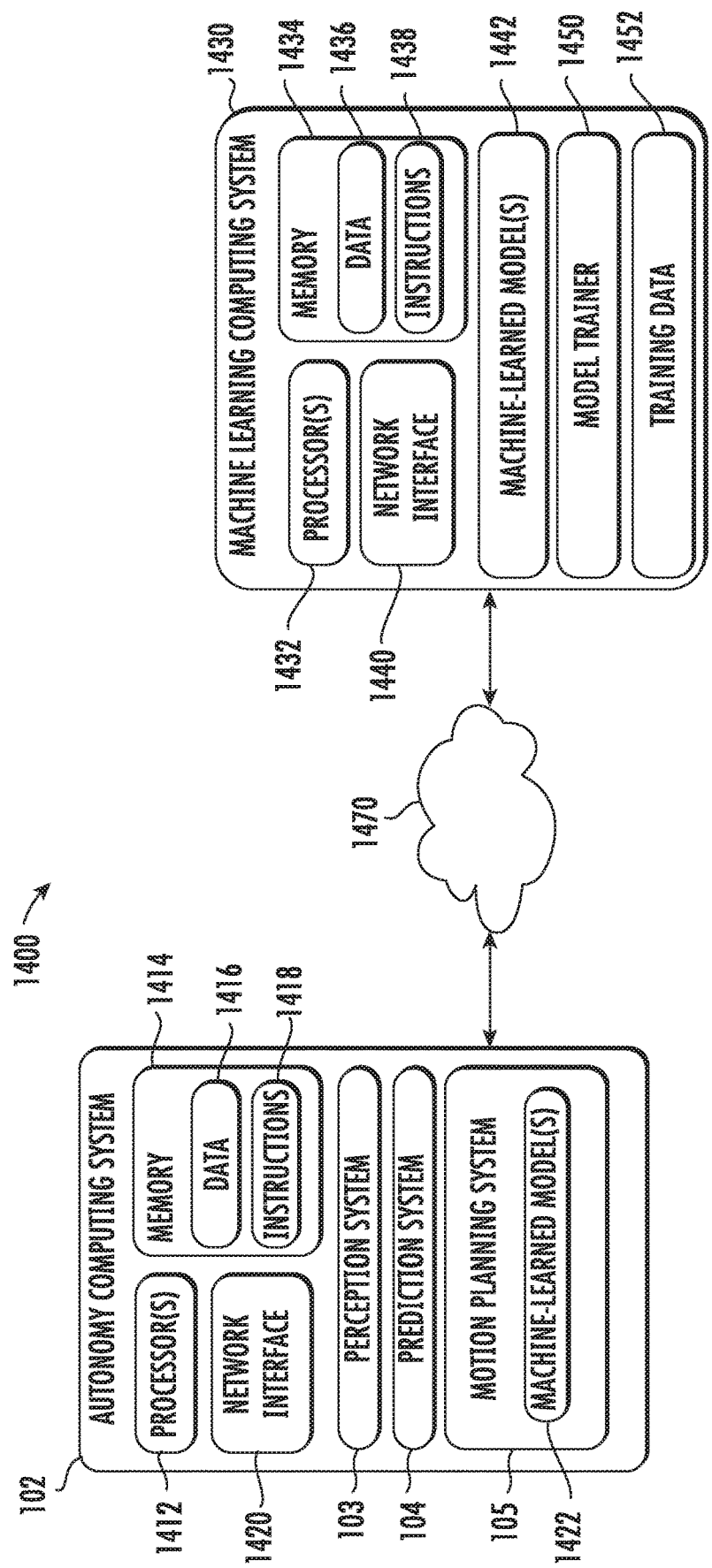

GRIDLOCK SOLVER FOR MOTION PLANNING SYSTEM OF AN AUTONOMOUS VEHICLE

PRIORITY CLAIM

The present application claims the benefit of U.S. Patent Application No. 62/681,482 filed Jun. 6, 2018, which is hereby incorporated by reference in its entirety.

FIELD

The present disclosure relates generally to autonomous vehicle technology. More particularly, the present disclosure relates to autonomous vehicles that feature a motion planning system having a discrete decision architecture and gridlock solver.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes determining, by a computing system that comprises one or more computing devices, one or more objects of interest having a predetermined manner of interaction with a lane sequence associated with a nominal path for an autonomous vehicle. The method also includes determining, by the computing system, one or more keep clear areas associated with the lane sequence. Each keep clear area is indicative of a region along the nominal path in which gridlock prevention is desired. The method also includes generating, by the computing system, a constraint for each of the one or more objects of interest and the one or more keep clear areas. Each constraint is defined as a constraint area in a multi-dimensional space. The multi-dimensional space includes at least a time dimension and a distance dimension relative to travel along the nominal path. The method also includes determining, by the computing system, a low-cost trajectory path through a portion of the multi-dimensional space that minimizes exposure to the constraint areas and that is consistent with all constraints generated for the one or more objects of interest and the one or more keep clear areas. The method also includes determining, by the computing system, a motion plan based at least in part on the low-cost trajectory path. The method also includes controlling, by the computing system, motion of the autonomous vehicle based at least in part on the motion plan.

Another example aspect of the present disclosure is directed to a computing system that controls an autonomous vehicle. The computing system includes one or more processors and one or more non-transitory computer-readable media that collectively store instructions that, when executed by the one or more processors, cause the computing system to perform operations. The operations include determining one or more keep clear areas associated with a lane sequence associated with a nominal path for an autonomous vehicle. Each keep clear area is indicative of a region along the nominal path in which gridlock prevention is desired. The operations also include generating a constraint for each of the one or more keep clear areas. Each constraint is defined as a constraint area in a multi-dimensional space. The multi-dimensional space includes at least a time dimension and a distance dimension relative to travel along the nominal path. The operations also include determining a low-cost trajectory path through a portion of the multi-dimensional space that minimizes exposure to the constraint areas and that is consistent with all constraints generated for the one or more keep clear areas. The operations also include determining a motion plan based at least in part on the low-cost trajectory path. The operations also include controlling motion of the autonomous vehicle based at least in part on the motion plan.

Another example aspect of the present disclosure is directed to an autonomous vehicle. The autonomous vehicle includes one or more processors and one or more non-transitory computer-readable media that collectively store instructions that, when executed by the one or more processors, cause the one or more processors to perform operations. The operations include determining one or more objects of interest having a predetermined manner of interaction with a lane sequence associated with a nominal path for an autonomous vehicle. The operations also include determining one or more keep clear areas associated with the lane sequence. Each keep clear area is indicative of a region along the nominal path in which gridlock prevention is desired. The operations also include generating a constraint for each of the one or more objects of interest and the one or more keep clear areas. Each constraint is defined as a constraint area in a multi-dimensional space, the multi-dimensional space comprising at least a time dimension and a distance dimension relative to travel along the nominal path. The constraint area associated with each keep clear area comprises a first spatial region associated with a first scoring factor and a second spatial region associated with the second scoring factor, wherein the first scoring factor and the second scoring factor are different. The operations also include determining a low-cost trajectory path through a portion of the multi-dimensional space that minimizes exposure to the constraint areas and that is consistent with all constraints generated for the one or more objects of interest and the one or more keep clear areas. The operations also include determining a motion plan based at least in part on the low-cost trajectory path. The operations also include controlling motion of the autonomous vehicle based at least in part on the motion plan.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 7A-7B depict respective graphical diagrams of example scenarios for determining yield zones according to example embodiments of the present disclosure.

FIG. 23 depicts a block diagram of an example computing system according to example embodiments of the present disclosure.

DETAILED DESCRIPTION

Figure 1:
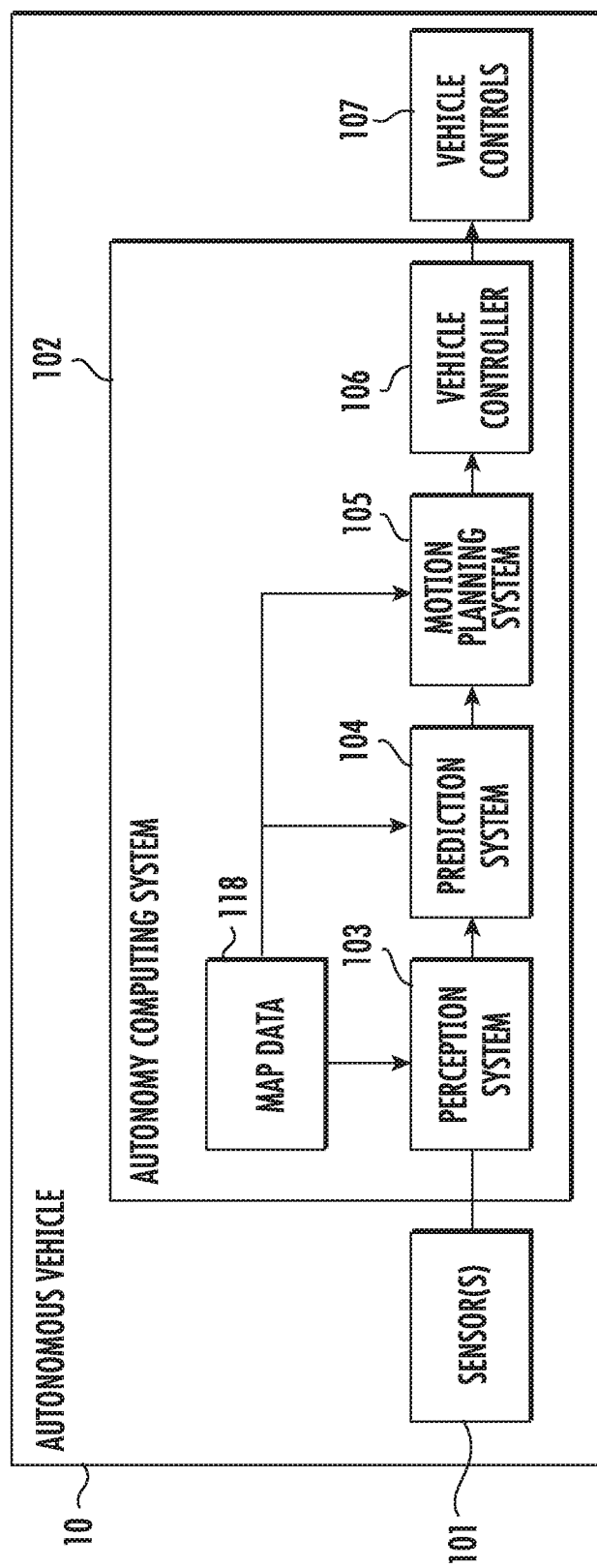
FIG. 1 depicts a block diagram of an example autonomous vehicle according to example embodiments of the present disclosure.

Generally, the present disclosure is directed to systems and methods that include or otherwise leverage a motion planning system that generates constraints as part of determining a motion plan for an autonomous vehicle (AV). In particular, a scenario generator within a motion planning system can generate constraints based on where objects of interest are predicted to be relative to an autonomous vehicle. A constraint solver can identify navigation decisions for each of the constraints that provide a consistent solution across all constraints. The solution provided by the constraint solver can be in the form of a trajectory path determined relative to constraint areas for all objects of interest. The trajectory path represents a set of navigation decisions such that a navigation decision relative to one constraint doesn't sacrifice an ability to satisfy a different navigation decision relative to one or more other constraints. The set of navigation decisions can then be used by an optimization planner within the motion planning system to search over a motion planning space to identify a motion plan that optimizes a total cost associated with the motion plan. The motion of the autonomous vehicle can be controlled in accordance with the motion plan, thus providing improved autonomous vehicle driving performance (e.g., safety, comfort, etc.) in various situations which require consistent navigation decisions to be made relative to multiple factors.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.). The autonomous vehicle can include an autonomy computing system that assists in controlling the autonomous vehicle. In some implementations, the autonomy computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of objects within the surrounding environment of the autonomous vehicle. For example, the objects can include traffic signals, additional vehicles, pedestrians, bicyclists, and/or other objects.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop sign or yield sign), traffic lights (e.g., stop light), or other traffic signals or control devices/markings (e.g., cross walks)); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for one or more of the objects, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system. In some implementations, predictions are provided only for objects of certain class(es).

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations. As one example, the motion planning system can include a trajectory generator that generates a planned trajectory (e.g., a motion plan) for the autonomous vehicle.

As an example, in some implementations, the motion planning system operates to generate a new autonomous motion plan for the autonomous vehicle multiple times per second. Each new autonomous motion plan can describe motion of the autonomous vehicle over a planning window that spans the next several seconds (e.g., 5 seconds). Thus, in some example implementations, the motion planning system continuously operates to revise or otherwise generate a short-term motion plan based on the currently available data.

In some implementations, the motion planning system (e.g., the trajectory generator) can include an optimization planner that, for each instance of generating a new motion plan, searches (e.g., iteratively searches) over a motion planning space (e.g., a vehicle state space) to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner can be or include an iterative linear quadratic regulator or similar iterative solver.

Once the optimization planner has identified the optimal motion plan (or some other iterative break occurs), the optimal motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

In some implementations, the motion planning system can employ or otherwise include one or more cost functions that, when evaluated, provide a total cost for a particular motion plan. The optimization planner can search over a motion planning space (e.g., a vehicle state space) to identify a motion plan that optimizes (e.g., locally optimizes) the total cost provided by the one or more cost functions.

In some implementations, different cost function(s) can be used depending upon a particular scenario that is selected by the motion planning system. In particular, in some implementations, the motion planning system can include a scenario generator that determines certain scenarios (e.g., a changing lanes scenario versus a queueing scenario) and guides the behavior of the autonomous vehicle according to the selected scenario. Different sets of one or more cost functions can correspond to the different possible scenarios and the cost function(s) corresponding to the selected scenario can be loaded and used by the motion planning system (e.g., the trajectory generator) at each instance of motion planning.

Thus, in some implementations, the motion planner or other portion of the autonomy computing system can include one or more scenario generators that make discrete decisions regarding control of the autonomous vehicle according to different scenarios. In some implementations, a scenario generator can include an object classifier, a constraint generator, a constraint solver, and a decision extractor. The output of the scenario generator can correspond to a set of navigation decisions that are determined relative to perceived objects and corresponding constraints. The set of navigation decisions can be communicated to the optimization planner, which can determine a motion plan optimized over a motion planning space defined by the set of navigation decisions.

More particularly, the scenario generator can include an object classifier that determines one or more objects of interest (e.g., vehicles, pedestrians, bicycles, etc.) that are interacting with a lane sequence (e.g., a lane sequence that an autonomous vehicle can follow without changing lanes) associated with a nominal path for an autonomous vehicle. In some implementations, an object classifier can more particularly include a blocking classifier, a yield zone generator, and a side classifier.

More particularly, in some implementations, an object classifier can be configured to determine how an object of interest is interacting with a given lane. In some implementations, objects of interest can be categorized according to one or more of a predetermined set of interaction modes. Example interaction modes can correspond, for instance, to tracking (e.g., tracking with an AV in a given lane), crossing (e.g., crossing in front of an AV in a given lane), entering (e.g., entering a given lane currently occupied by an AV), exiting (e.g., exiting a given lane currently occupied by an AV), oncoming (e.g., heading towards an AV in a given lane), parked (e.g., parked in a given lane occupied by an AV), etc. In some implementations, an object classifier can be configured to determine a side of a nominal path for the AV for each object considered to be non-blocking. For example, a parked vehicle may be determined to be on the left side of a given lane at a certain time period or a crossing pedestrian may be determined to be on the right side of a given lane at a certain time period.

More particularly, an object classifier can make determinations based on world state data determined by an autonomy computing system. For example, the autonomy computing system can determine one or more features associated with an object and/or the surrounding environment. For example, the features can be determined based at least in part on the state data associated with the object. In some implementations, the autonomy computing system can determine the feature(s) based at least in part on other information, such as the acquired map data. The feature(s) can be indicative of the movement (or lack thereof) and/or position of the object relative to items within the vehicle's surroundings and/or other information associated with the object. For example, the feature(s) can include a location of the object relative to a travel way (e.g., relative to the left or right lane markings), a location of the object relative to the autonomous vehicle (e.g., a distance between the current locations of the vehicle and the object), one or more characteristic(s) of the object relative to a travel route associated with the autonomous vehicle (e.g., whether the object is moving parallel, towards, or away from the vehicle's current/future travel route or a predicted point of intersection with the vehicle's travel route), etc. In some implementations, the feature(s) determined for a particular object may depend at least in part on the class of that object. For example, the predicted path for a vehicle or bicycle traveling on a roadway may be different than that associated with a pedestrian traveling on a sidewalk. World state data that includes features associated with one or more objects of interest can also be referred to as feature data.

More particularly, in some implementations, a blocking classifier associated with an object classifier can be configured to determine one or more blocking objects based at least in part on a manner of interaction that an object of interest has with a given lane or lane sequence. In some implementations, an object of interest in a given lane can be determined to be a blocking object relative to an AV operating in the same given lane when the object of interest has a manner of interaction that provides insufficient spatial clearance and/or temporal clearance for the AV to pass the object within the lane. In some implementations, an object of interest in a given lane can be determined to be a blocking object relative to an AV operating in the same given lane when the object of interest has a manner of interaction that positions the object either ahead or behind the AV and moving with the flow of traffic.

More particularly, a blocking classifier can analyze feature data associated with objects of interest to determine one or more blocking objects. In some implementations, a blocking classifier can analyze feature data associated with objects of interest using one or more hard-coded rules and/or heuristics to classify each object as a blocking object or a non-blocking object. In some implementations, the blocking classifier can include or otherwise access a machine-learned blocking classifier model that is trained to determine from feature data associated with an object whether to classify the object as a blocking object or a non-blocking object. In some implementations, feature data descriptive of an object (e.g., a first object) perceived by an autonomous vehicle can be obtained. The feature data can be provided as input to the machine-learned blocking classifier model, and in response, a blocking decision can be received as output of the machine-learned blocking classifier model. The blocking decision can describe the object (e.g., the first object) as a blocking object or a non-blocking object.

When an object of interest is determined to be a blocking object, a constraint can be generated for that object that requires the AV to be ahead or behind the predicted object at one or more given times. In other words, a constraint associated with a blocking object prevents an AV from being at the same longitudinal distance and time as the object within a given lane regardless of how far the AV shifts in the lateral direction within the lane. When a constraint for a blocking object is generated in a multi-dimensional space such as that path time space embodiment described herein, a constraint area completely encompasses a lateral swath of the multi-dimensional space corresponding to a start and stop distance for all times in a given timespan along the time dimension.

More particularly, in some implementations, a yield zone generator within an object classifier can be configured to determine one or more yield zones. In some implementations, yield zones can be defined as a spatial and temporal region that an AV cannot be within. For example, a yield zone can be defined for intersections such as, but not limited to traffic lights, stop signs, crosswalks, etc. In another example, yield zones can be defined relative to objects of interest that are considered to be crossing actors relative to an AV (e.g., another vehicle making an unprotected left in front of the AV, a jaywalker, another vehicle turning across the AV's current lane, etc.). When crossing actors are identified, the yield zone generator can thus determine a fixed area (e.g., a fixed area defined relative to a map) for ensuring that the autonomous vehicle does not stop in the area where it perceives actors to be crossing.

In some implementations, a constraint generator is configured to generate a constraint for each of the one or more objects of interest determined by the object classifier (e.g., blocking objects, yield zones, etc.). Each constraint can be associated with a corresponding constraint area defined relative to a multi-dimensional space. In some implementations, the multi-dimensional space (e.g., a path time (PT) space) comprises at least a time dimension and a distance dimension relative to travel along the nominal path. Generally, each constraint area can identify regions along the nominal path in which it is desired to minimize exposure of the autonomous vehicle at certain times.

In some implementations, a nominal path associated with constraints and constraint areas as described herein can correspond to a predetermined potential path for an autonomous vehicle. As an example, in some instances, nominal paths can generally correspond to common patterns of vehicle travel along one or more lanes (e.g., lanes on a roadway or other travelway). As one example, a nominal path can generally describe a path by which a vehicle or other object may: continue according to its current lane; merge from its current lane into an adjacent lane; turn from the current lane into an adjacent road portion; or other pathways that correspond to other driving actions. In some implementations, nominal paths can be defined relative to map data associated with various roadways, road portions or segments, lanes, or the like. For example, nominal paths can be defined as a center line or other line parallel or in some predetermined relationship relative to such roadways, road portions or segments, lanes, or the like.

In some implementations, each constraint area can be defined by one or more of a start time when the constraint begins, a stop time when the constraint ends, a start distance along the nominal path when the constraint begins, a stop distance along the nominal path when the constraint ends, and/or a maximum velocity that an autonomous vehicle can travel through the constraint area.

In some implementations, each constraint area can be defined by one or more constraint sequences. A constraint sequence can correspond to a plurality of linear constraints that are successively sampled over a duration in time and sequentially combined to create the constraint sequence. Constraint sequences can be employed to generate more complex (e.g., non-linear) shapes within the multi-dimensional space (e.g., PT space), which can be representative of object motion/velocity that is dynamic instead of constant within the PT space. For example, if a detected object (e.g., a vehicle) is accelerating in front of the AV in the same lane as the AV, a constraint associated with the detected object can be modeled as a quadratic upward sweeping constraint in the PT space. This more complex constraint area can be approximated with a constraint sequence of linear constraints, where each successive linear constraint within the constraint sequence has a steeper slope than the last. These successive linear constraints can be sampled at a predetermined frequency (e.g. 1 Hz) for the duration of time in which the detected object is blocking the lane.

In some implementations, constraints can be generated for the time dimension corresponding to a certain time period (e.g. a ten second time period) that includes a plurality of time steps (e.g., one second time intervals or less). In some implementations, constraints are generated based on how objects are classified according to each respective time step. For example, an object can be considered a blocking object during a first time step (t0, t1) but a non-blocking object during a second time step (t1, t2). As such, at each time step during a time period, an autonomy computing system can classify an object (e.g., by determining if the object is or is not blocking a lane) and generate a corresponding constraint based on the classification.

In some implementations, the constraint generator can be further configured to generate one or more buffer zones. A buffer zone can be defined relative to a constraint to provide additional areas in the multi-dimensional space for having further clearance relative to an object of interest. In some implementations, a buffer zone associated with a given constraint corresponds to an area within multi-dimensional space that surrounds at least a portion of a constraint area within the multi-dimensional space. For example, a temporal buffer zone can be created that has a start time that is before the start time of an associated constraint and/or a stop time that is after the stop time of the associated constraint. A spatial buffer zone can be created that has as start distance that is before the start distance of an associated constraint and/or a stop distance that is after the stop distance of the associated constraint.

In some implementations, the constraint generator can include one or more speed regressors configured to generate one or more speed zones within the multi-dimensional space. A speed zone can be defined as a constraint area within multi-dimensional space in which an AV can travel, but with limitations on AV travel speed. As such, constraint areas can be defined within multi-dimensional space that control how fast an AV travels relative to specific areas in space and time (e.g., areas corresponding to other objects, areas corresponding to specific locations on a map, areas associated with a particular maneuver of the AV at a given time, etc.)

In some implementations, the constraint generator can include one or more gridlock constraint generators. A gridlock constraint generator can be configured to generate constraints for one or more keep clear areas associated with a lane sequence. Keep clear areas can be indicative of a region along a nominal path in which gridlock prevention is desired. In some implementations, intersections are included as keep clear areas, including but not limited to intersections associated with one or more traffic lights, stop signs, crosswalks, or the like. Gridlock prevention within an intersection or other keep clear area can help prevent blocking of the intersection by an autonomous vehicle entering the intersection but unable to pass through it. The inclusion of a gridlock constraint generator and/or other gridlock solver components or features can thus help an AV stop before an intersection if it looks like traffic is stopped in the intersection. This can effectively help prevent an AV from being stuck in the intersection when other lanes of traffic eventually get the right of way and would want to proceed through the intersection.

More particularly, a constraint generator can be configured to generate a constraint for each keep clear area. Similar to constraints for objects of interest, constraints for keep clear areas can be defined as a constraint area in multi-dimensional space (e.g., a multi-dimensional space including at least a time dimension and a distance dimension relative to travel along the nominal path (e.g., PT space)). In some implementations, a gridlock constraint generated for a keep clear area can include different first and second spatial regions. For example, a first spatial region can correspond to the entirety of an intersection, while the second spatial region can correspond to a portion of the intersection in which a current lane encounters one or more conflicting lanes (e.g., lane(s) in which potential traffic in the form of vehicles, trains, etc. crosses that of a current lane of the autonomous vehicle). In some implementations, different scoring factors can be associated with the different first and second spatial regions such that trajectory paths determined relative to such spatial regions can be costed accordingly in a customizable fashion relative to desired action of the autonomous vehicle relative to the spatial regions of the gridlock constraint.

By providing a gridlock solver embodiment that incorporates a gridlock constraint generator directly into the multi-dimensional space described herein, gridlock determinations can be made directly when trajectory paths are determined by the constraint solver. Additional technical effects and benefits can be achieved in accordance with such a gridlock solver embodiment. For example, the constraint solver can cost rollouts (e.g., candidate trajectory paths) that get stuck in intersections such that rollouts that either end before an intersection or go through an intersection are preferred over rollouts that undesirably stop in an intersection, thus avoiding motion plans that could result in a potential cause of gridlock. In some embodiments, the constraint solver can cost or penalize rollouts that end in one or more portions of an intersection when one or more vehicles are also predicted to be ahead of the AV at the end of the rollout such that the AV would be prevented from exiting the region. For example, such rollouts can incur a quadratic cost for how far beyond the start of a gridlock constraint the AV is projected to travel when the other penalty conditions exist. Interaction with other constraints in the multi-dimensional space (e.g., constraints associated with detected objects of interest, speed zones, traffic lights, stop signs, etc.) can also be directly included in the gridlock decision through the rollouts and constraints without requiring any separate computational analysis. In addition, different spatial regions within an intersection or adjacent areas can be advantageously encoded with different scoring factors associated with different levels of gridlock. These different scoring factors can be representative of situations when some regions of an intersection (e.g., conflicting lanes) are worse for an autonomous vehicle to block than other regions.

In some implementations, the scenario generator can be further configured to identify navigation decisions for each of the constraints generated by the constraint generator that provides a consistent solution across all constraints. For example, a constraint solver can be configured to determine a low-cost trajectory path that traverses through the multi-dimensional space that minimizes exposure to and/or does not include the constraint areas. It should be appreciated that many different methods can be utilized to determine the low-cost trajectory path through the multi-dimensional space. In one example implementation, a rollout method is employed whereby determining a low-cost trajectory path through a portion of the multi-dimensional space that does not include the constraint areas includes determining a set of candidate trajectory paths through the multi-dimensional space. A score for each candidate trajectory path in the set of candidate trajectory paths can be generated, and a selected low-cost trajectory path can be determined based at least in part on the scores for each candidate trajectory path in the set of candidate trajectory paths.

With more particular reference to determining a low-cost trajectory path, the score generated for each candidate trajectory path can include one or more scoring factors, including but not limited to costs, discounts and/or rewards associated with aspects of a candidate trajectory path for use in evaluation of a cost function or other scoring equation. Example scoring factors can include, for example, a dynamics cost for given dynamics (e.g., jerk, acceleration) associated with the candidate trajectory path, a buffer cost associated with proximity of a candidate trajectory path to one or more constraints and/or buffer zones within the multi-dimensional space, a constraint violation cost associated with violating one or more constraints and/or buffer zones, a reward or discount for one or more achieved performance objectives (e.g., a distance traveled reward for moving forward as opposed to not moving), a blind spot cost associated with a candidate trajectory path that involves spending time in a blind spot of other actors (e.g., other vehicles). The constraint solver can be configured to determine the low-cost trajectory path by determining the candidate trajectory path that has a lowest total cost (or highest reward) associated with the trajectory path.

In some embodiments, a gridlock solver can additionally or alternatively be included within the scenario generator after the constraint solver determines a low-cost trajectory path and/or after a route selector determines the best maneuver. Such a gridlock solver can be provided in addition to the gridlock constraint generator described herein or as an alternative to the gridlock constraint generator. In some embodiments, the gridlock solver can be configured to determine when the low-cost trajectory path includes a stop before or in one or more portions of an intersection. In some embodiments, the gridlock solver can be configured to determine when the low-cost trajectory path ends in one or more portions of an intersection (e.g., a gridlock region) and there is a vehicle predicted to be ahead of the AV at the end of the trajectory path that would prevent the AV from exiting the one or more portions of the intersection (e.g., the gridlock region). This latter situation could correspond, for example, to one in which a stopped vehicle is in the intersection ahead of the AV. When the scenario generator includes a gridlock constraint generator, determining when the low-cost trajectory path includes a stop before or in an intersection can include determining when the low-cost trajectory path includes a stop before or in one or more spatial regions associated with a gridlock constraint area (e.g., a keep clear area). Similarly, determining when the low-cost trajectory path ends in one or more portions of an intersection can include determining when the low-cost trajectory path ends in one or more spatial regions associated with a gridlock constraint area (e.g., a keep clear area). In response to determining that the low-cost trajectory path includes a stop before or in an intersection, or that the low-cost trajectory path ends in an intersection and another vehicle is stopped in the intersection in a manner that would prevent the AV from proceeding through the intersection, the gridlock solver can be configured to generate one or more yield fences. For example, the gridlock solver can be configured to generate a hard yield fence for spatial regions associated with conflicting lanes and/or a soft yield fence for spatial regions associated with the intersection at large. These soft and hard yield fences can be used to help determine an optimized motion plan that further avoids potential gridlock in a manner that accommodates smooth acceleration/deceleration by the autonomous vehicle.

In some implementations, the scenario generator can be further configured to extract a set of navigation decisions from the determined trajectory path. For example, a decision extractor can be configured to translate the trajectory path into a set of navigation decisions based at least in part on whether the trajectory path passes above or below each constraint area associated with an object of interest within the multi-dimensional space. More particularly, in some implementations, navigation decisions can correspond to possible actions (e.g., lead, follow, ignore, nudge, clear, yield, etc.) that an AV can take relative to an object of interest, a keep clear area, or other region associated with a constraint. In some implementations, the set of navigation decisions relative to the one or more objects of interest can include one or more of a navigation decision to lead or follow an object of interest or a navigation decision to yield or clear an object of interest, keep clear area, or other region associated with a constraint. In some implementations, the scenario generator can thus determine high-level decisions that correspond to or otherwise mimic human-level understanding and decision making about the surrounding environment (e.g., whether to lead or follow a particular object or whether to yield to or clear a particular object).

In some implementations, the decision extractor can also be configured to prune a subset of constraints when a first portion of navigation decisions in the set of navigation decisions renders the subset of the constraints as no longer affecting a second portion of navigation decisions in the set of navigation decisions. Pruning can help advantageously reduce the number of data variables ultimately provided from the scenario generator to the optimization planner, thus also reducing processing latency at the optimization planner within the motion planning system.

Once such discrete decisions have been made, the trajectory generator can generate a trajectory (e.g., through local optimization over a set of appropriate cost functions) that executes or otherwise complies with the decisions made by the scenario generator. More particularly, for example, the set of navigation decisions determined by the decision extractor can be sent to the optimization planner within the motion planning system. As previously described, the optimization planner searches over a motion planning space to identify a motion plan that optimizes (e.g., locally optimizes) a total cost associated with the motion plan, as provided by one or more cost functions.

The motion planning space analyzed by the optimization planner can be defined at least in part by the set of navigation decisions determined by the scenario generator. As such, the optimization planner can have a focused motion planning space that is consistent with the trajectory path determined by the scenario generator. The motion plan can be optimized relative to multiple space dimensions (e.g., a lateral dimension associated with steering of the AV as well as a longitudinal dimension associated with braking/acceleration of the AV) for a given period of time.

The autonomy computing system can control the autonomous vehicle to implement the motion plan. For example, the motion planning system can provide the selected motion plan to a vehicle controller that controls one or more vehicle controls (e.g., actuators that control gas flow, steering, braking, etc.) to execute the selected motion plan until the next motion plan is generated.

According to an aspect of the present disclosure, the motion planning system of the autonomy computing system can be further configured to determine a best route maneuver including a sequence of one or more successive lane sequences associated with the nominal path for the autonomous vehicle at a given time. For example, a route maneuver corresponding to a lane change can include a lane sequence associated with a first lane, a lane sequence transitioning from the first lane to a second lane, and a lane sequence associated with the second lane. Various algorithmic determinations made by the scenario generator can be implemented for each of the different successive lane sequences in the route maneuver. For example, object classifications (e.g., determining object-lane interactions, blocking classifications, yield zones and the like) can be implemented for each of the one or more successive lane sequences in a route maneuver.

In some implementations, the best route maneuver can be determined from a plurality of possible route maneuvers. For example, a constraint generator and constraint solver associated within a motion planning system of an autonomous vehicle can be configured to generate constraints and determine (e.g., via a constraint solver) a low-cost trajectory path for each of the plurality of possible maneuvers. A route selector or other suitable processing component within the motion planning system can be configured to pick the best maneuver based at least in part on the score for each maneuver's best trajectory path (e.g., the low-cost trajectory path) and a relative urgency factor indicative of the relative need or preference of each maneuver (e.g., the urgency to lane change now versus staying in a current lane). As such, a scenario generator can be configured to implement a two-stage selection process. First, the scenario generator can determine a best trajectory path (e.g., a low-cost trajectory path) for each maneuver based in part on the best score among candidate trajectory paths. Second, the scenario generator can determine the best maneuver based on the score of its best trajectory and on the relative preference of the maneuver type (e.g., how urgent it is to change lanes).

According to an aspect of the present disclosure, the motion planning system can implement a specific type of data transformation during scenario generation when determining a motion plan that includes multiple lanes or lane sequences, such as during a lane change. For example, in some implementations, the performance of a lane change for an autonomous vehicle may occur in a number of phases defined relative to at least first and second lanes which can be used in accordance with the disclosed motion planning system and associated aspects. In some implementations of the disclosed technology, a lane change can be viewed as being divided into three phases. The first (initiation) phase of a lane change may begin once the autonomous vehicle determines that a safe lane change can be executed and the autonomous vehicle may signal the intention to change lanes. During the first phase, the autonomous vehicle may remain positioned within the first lane (e.g., a current/original lane). During the second (movement or transition) phase of the lane change, the autonomous vehicle moves out of the first lane and at least partially crosses a lane boundary between first and second lanes as it begins to move into the second lane (e.g., an adjacent/target lane). During the third phase of the lane change, the autonomous vehicle has completely moved into the second lane and proceeds within the boundaries of the target lane.

During a lane change maneuver, a scenario generator in accordance with a motion planning system can be configured to perform certain steps and functions in different phases. For example, in some implementations, a different multi-dimensional space (e.g., a path time space) can be determined for each phase of a plurality of different phases of a lane change maneuver associated with at least first and second lanes of a nominal path for an autonomous vehicle. In some implementations, the plurality of different phases of the lane change maneuver can include a first phase when the autonomous vehicle operates within the boundaries of the first lane, a second phase when the autonomous vehicle has partially crossed a lane boundary between the first lane and the second lane and is in transition from the first lane into the second lane, and a third phase when the autonomous vehicle has completely moved into the second lane and operates within the boundaries of the second lane.

For each different phase of the lane change maneuver, the scenario generator can be configured to implement respective steps. More particularly, in one implementation, for each different phase of the lane change maneuver, a scenario generator can be configured to determine one or more objects of interest having a predetermined manner of interaction with the first and second lanes of the nominal path during the phase. The scenario generator can be further configured to generate a constraint for each of the one or more objects of interest. Each constraint can identify a constraint area along the nominal path that the autonomous vehicle cannot be during the phase of the lane change maneuver. The scenario generator can be further configured to determine a portion of the multi-dimensional space including corresponding constraints that applies to a respective timeframe associated with the phase.

In accordance with the lane change representation, the respective portions of the multi-dimensional space including corresponding constraints for each phase of the plurality of different phases of the lane change maneuver can be combined to create a temporally multiplexed space. For example, the temporally multiplexed space can have a first portion corresponding to the first phase of the lane change, a second portion corresponding to the second phase of the lane change, and a third portion corresponding to the third phase of the lane change. Each of these portions can be successively multiplexed across the time dimension of the multi-dimensional space in which various constraints are defined. A set of navigation decisions can then be determined relative to the one or more objects of interest across the different phases and corresponding timespans of the multiplexed space. For example, a trajectory path can be determined through a portion of the multiplexed space that does not include the constraint areas. As previously described, a set of navigation decisions can then be extracted from the trajectory path and provided to an optimization planner to generate a motion plan for controlling the AV.

According to another aspect of the present disclosure, the autonomy computing system can include or otherwise leverage one or more machine-learned models as part of the motion planning system. For example, in some implementations, one or more of the object classifier, blocking classifier, side classifier, or the like can include or otherwise employ a machine-learned model. The following description refers to use of a machine-learned model for the blocking classifier, although it should be appreciated that similar techniques can be employed for other classifiers or motion planning components described herein. In addition, it should be appreciated that in some implementations, the object classifier, blocking classifier, side classifier and/or other components can employ one or more hard-coded rules and/or heuristics instead of machine-learned model(s) to determine object features, classifications, etc.

For example, a machine-learned blocking classifier model can be included in and/or employed by the motion planning system (e.g., included in and/or employed by the scenario generator described above). The machine-learned blocking classifier model can be trained or otherwise configured to receive and process feature data descriptive of objects perceived by the autonomous vehicle and/or the surrounding environment and, in response to receipt of the feature data, provide a blocking decision for the object (e.g., data indicative of whether the object should be classified as a blocking object or a non-blocking object).

According to another aspect of the present disclosure, the autonomy computing system can determine a blocking decision for each object of interest based at least in part on the feature(s) associated with an object. To do so, the autonomous vehicle can include, employ, and/or otherwise leverage the machine-learned blocking classifier model. For example, the machine-learned blocking classifier model can be or can otherwise include one or more various model(s) such as, for example, decision tree-based models (e.g., random forest models such as boosted random forest classifiers), neural networks (e.g., deep neural networks), or other multi-layer non-linear models. Neural networks can include recurrent neural networks (e.g., long short-term memory recurrent neural networks), feed-forward neural networks, convolutional neural networks, and/or other forms of neural networks.

According to another aspect of the present disclosure, supervised training techniques can be performed to train the model to determine a blocking decision based at least in part on the feature(s) associated with an object. For example, the machine-learned blocking classifier model can be trained based at least in part on driving log data annotated with blocking labels. The log data can include objects of interest that were perceived by an AV during real-world and/or simulated operation of the AV and a blocking label identifying objects of interest as blocking objects or non-blocking objects. As one example, the blocking decisions for perceived objects of interest can be hand-labelled as positive training examples or negative training examples by a human reviewer. As another example, the blocking decisions can be automatically scored using scoring functions indicative of how a human driver operated a vehicle or otherwise behaved relative to an object of interest. For example, the scoring functions or other labelling rules can be derived from a data analysis of log data. In some implementations, if the blocking decision receives a score that is greater than a first threshold (or less than depending on scoring style) the blocking decision can be labelled as a positive training example; while if the blocking decision receives a score that is less than a second threshold (or greater than depending on scoring style) the blocking decision can be labelled as a negative training example. In some implementations, the first threshold and the second threshold can be the same value. In some implementations, the first threshold and the second threshold can be different values and yield behaviors that receive scores between the first threshold and the second threshold can simply be discarded. In some implementations, the scores provided for the blocking decisions are included as labels to train the blocking classifier model, in addition or alternatively to a simple positive or negative label.

The systems, methods, and vehicles described herein may provide a number of technical effects and benefits. For instance, the vehicle computing system can locally (e.g., on-board the vehicle) detect an object, evaluate its features (e.g., speed, location, path) relative to the vehicle and/or the surroundings, and determine a motion plan of the vehicle accordingly. By performing such an operation on-board the autonomous vehicle, the vehicle computing system can avoid the latency issues that arise by communicating with a remote computing system. The vehicle computing system can be configured to continuously perform this iterative optimization process as the vehicle travels and different objects become proximate to the autonomous vehicle. As such, the vehicle computing system can proactively control the motion of the autonomous vehicle to avoid sudden movements that place stress on the vehicle's systems and confuse or frighten users (e.g., passengers of the vehicle). Moreover, the autonomous vehicle can operate in a manner that is safer for the objects in the vehicle's surroundings.

The systems, methods, and vehicles described herein also provide a framework for determining a set of navigation decisions that are consistent across multiple constraints that can be simultaneously represented within a multi-dimensional space. Because of the unique manner in which multiple constraints can be represented in multi-dimensional space, situations can be avoided whereby a given classifier in a scenario generator could potentially generate a navigation decision that conflicts with a separate classifier. In particular, a framework is provided by which AV behavior relative to objects of interest, fixed locations on a map, and/or speed limitations can all be simultaneously represented in a single computational framework. This allows trajectory paths (as well as a related set of navigation decisions and resultant motion planning space) to be determined that account for multiple dynamically shifting factors that may arise during AV navigation.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. For example, the systems and methods of the present disclosure can allow one or more computing devices on-board an autonomous vehicle to determine a scenario and motion plan for the autonomous vehicle based at least in part on one or more machine-learned classifier models (e.g., an object classifier, blocking classifier, etc.). By utilizing the machine-learned model(s), the autonomous vehicle can avoid the use of a rules-based determination system, which can be less effective and flexible for object classification and scenario generation. Moreover, the machine-learned model(s) can be more easily adjusted (e.g., via refinement training) than a rules-based system (e.g., requiring re-written rules or manually tuned parameters) as the vehicle computing system is periodically updated to handle new scenarios. This can allow for more efficient upgrading of the vehicle computing system, leading to less vehicle downtime.

The disclosed systems, methods and vehicles have a technical effect and benefit of improved scalability by using one or more machine-learned models to classify object-lane interaction, blocking, etc. In particular, modeling feature data and determining appropriate object classifications through machine-learned models greatly reduces the research time needed relative to development of hand-crafted yield decision rules. For example, for hand-crafted object classification rules, a designer would need to exhaustively derive heuristic models of how different vehicles would need to classify objects in different scenarios. It can be difficult to create hand-crafted rules that effectively address all possible scenarios that an autonomous vehicle may encounter relative to detected objects. In addition, hand-crafted rules for determining classifications relative to objects may not easily scale from one location to another. For instance, how a vehicle should behave around pedestrians may be different in Pittsburgh, Pa. as opposed to New York City, N.Y. or in the United States versus another country. As such, it can be difficult to create effective hand-crafted rules, and even more so to create different sets of hand-crafted rules for different locations. By contrast, to use machine-learned models as described herein, machine-learned models can be trained on appropriate training data, which can be done at a massive scale if the training system permits. In addition, the machine-learned models can easily be revised as new training data is made available. As such, use of a machine-learned model trained on driving logs specific to a particular location can provide a scalable and customizable solution.

The disclosed systems, methods and vehicles have an additional technical effect and benefit of improved adaptability and opportunity to realize improvements in related autonomy systems. An autonomy system can include numerous different subsystems (e.g., perception, prediction, motion planning, etc.) that jointly operate to determine a vehicle's motion plan. As technology improvements to one subsystem are introduced, machine-learned models in the motion planning system can capitalize on those improvements to create a further refined and more accurate determination of object classifications, generated scenarios and/or motion plans relative to objects, for example, by simply retraining the existing model on new training data captured by the improved autonomy subsystems. Thus, obtaining object classifications, generated scenarios and/or motion plans based on newly available data types may be more easily achievable by a machine-learned yield model as opposed to hand-crafted algorithms.

With reference now to the Figures, example embodiments of the present disclosure will be discussed in further detail.

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, an autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion plan through such surrounding environment. The autonomy computing system 102 can control the one or more vehicle controls 107 to operate the autonomous vehicle 10 according to the motion plan.

As illustrated in FIG. 1, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 118 that provides detailed information about the surrounding environment of the autonomous vehicle 10. The map data 118 can provide information regarding: the identity and location of different travelways (e.g., roadways), road segments, intersections, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the autonomy computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 118. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of proximate objects and/or predicted future locations of proximate objects, the motion planning system 105 can determine a motion plan for the autonomous vehicle 10 that best navigates the autonomous vehicle 10 relative to the objects at their current and/or future locations. As one example, the motion planning system 105 can generate a planned trajectory (e.g., a motion plan) for the autonomous vehicle 10.

As an example, in some implementations, the motion planning system 105 operates to generate a new autonomous motion plan for the autonomous vehicle 10 multiple times per second. Each new autonomous motion plan can describe motion of the autonomous vehicle 10 over a planning window that spans the next several seconds (e.g., 5 seconds). Thus, in some example implementations, the motion planning system 105 continuously operates to revise or otherwise generate a short-term motion plan based on the currently available data.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment.

The motion planning system 105 can determine the plurality of features for each vehicle state included in the current candidate motion plan. The motion planning system 105 can determine the plurality of features for each vehicle state included in the candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan to a vehicle controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a one or more suitable processing devices. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
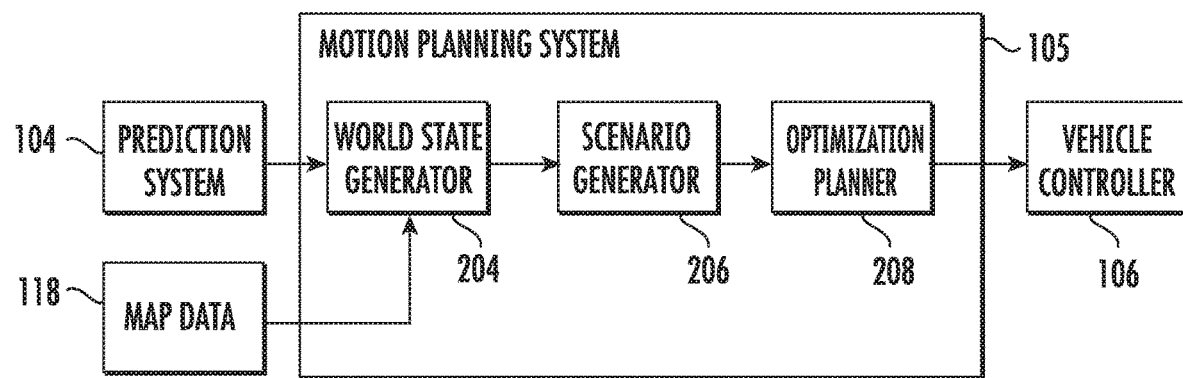
FIG. 2 depicts a block diagram of an example motion planning system according to example embodiments of the present disclosure.

FIG. 2 depicts a block diagram of an example motion planning system 105 according to example embodiments of the present disclosure. The example motion planning system 105 includes a world state generator 204, a scenario generator 206, and an optimization planner 208.

The world state generator 204 can receive information from the prediction system 104, the map data 118, and/or other information such as vehicle pose, a current route, or other information. The world state generator 204 can synthesize all received information to produce a world state that describes the state of all objects in and other aspects of the surrounding environment of the autonomous vehicle (e.g., autonomous vehicle 10) at each time step.

The scenario generator 206 can generate constraints as part of determining a motion plan for an autonomous vehicle (e.g., autonomous vehicle 10). In particular, scenario generator 206 within motion planning system 105 can generate constraints based on where objects of interest are predicted to be relative to an autonomous vehicle, such as indicated by world state generator 204. A constraint solver within scenario generator 206 can identify navigation decisions for each of the constraints that provide a consistent solution across all constraints. The solution provided by the constraint solver can be in the form of a trajectory path determined relative to constraint areas for all objects of interest. The trajectory path represents a set of navigation decisions such that a navigation decision relative to one constraint doesn't sacrifice an ability to satisfy a different navigation decision relative to one or more other constraints. The set of navigation decisions can then be used by optimization planner 208 within motion planning system 105 to search over a motion planning space to identify a motion plan that optimizes a total cost associated with the motion plan. More particular details associated with one example implementation of scenario generator 206 are depicted relative to FIG. 4.

The optimization planner 208 can be configured to iteratively search over a motion planning space to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner 208 can be or include an iterative linear quadratic regulator or similar iterative solver. More particular details associated with one example implementation of optimization planner 208 are depicted relative to FIG. 3.

Once the optimization planner 208 has identified the optimal motion plan (or some other iterative break occurs), the optimal motion plan can be selected and executed by the autonomous vehicle. For example, the motion planning system 2150 can provide the selected motion plan to a vehicle controller 210 that controls one or more vehicle controls (e.g., actuators that control gas flow, steering, braking, etc.) to execute the selected motion plan until the next motion plan is generated.

Each of the world state generator 204, scenario generator 206, and optimization planner 208, and penalty/reward generator 302 can include computer logic utilized to provide desired functionality. In some implementations, each of world state generator 204, scenario generator 206, and optimization planner 208 can be implemented in hardware, firmware, and/or software controlling one or more suitable processing devices. For example, in some implementations, each of world state generator 204, scenario generator 206, and optimization planner 208 includes program files stored on a storage device, loaded into a memory and executed by one or more processors. In other implementations, each of world state generator 204, scenario generator 206, and optimization planner 208 includes one or more sets of computer-executable instructions that are stored in a tangible computer-readable storage medium such as RAM hard disk or optical or magnetic media.

Figure 3:
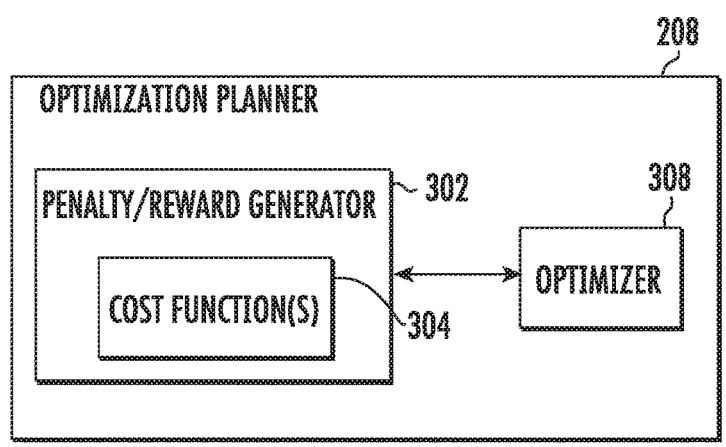
FIG. 3 depicts a block diagram of an example optimization planner according to example embodiments of the present disclosure.

FIG. 3 depicts a block diagram of an example optimization planner 208 according to example embodiments of the present disclosure. In some implementations, optimization planner 208 can correspond to optimization planner 208 of FIG. 2. As described above, the optimization planner 208 can iteratively search over a motion planning space (e.g., a motion planning space identified by constraint generator 206 of FIG. 2) to identify a motion plan that optimizes (e.g., locally optimizes) a total cost associated with the motion plan. In particular, the example optimization planner 208 can implement an optimizer 308 to optimize the total cost. The optimizer 308 can be or include a solver (e.g., an iterative solver) or other optimization tool that is able to optimize the total cost. In some implementations, the optimizer 308 is an iterative linear quadratic regulator.

According to an aspect of the present disclosure, the total cost can be based at least in part on one or more cost functions 304. In one example implementation, the total cost equals the sum of all costs minus the sum of all rewards and the optimization planner attempts to minimize the total cost. The cost functions 304 can be evaluated by a penalty/reward generator 302.

In some implementations, different cost function(s) 304 can be used depending upon a particular trajectory path and/or associated set of navigation decisions represented by the trajectory path as determined by scenario generator 206. The set of navigation decisions can then be used by optimization planner 208 within motion planning system 150 to search over a motion planning space to identify a motion plan that optimizes a total cost associated with the motion plan. Different sets of one or more cost functions 304 can correspond to the different navigation decisions determined by the scenario generator and penalty/reward generator 302 can load the cost function(s) 304 corresponding to the selected navigation decision(s) at each instance of motion planning.

In other implementations, the same cost function(s) 304 can be used at each instance of motion planning (e.g., no particular scenarios are used). In some implementations, the optimization planner 208 does not include the penalty/reward generator 302.

To provide an example cost function 304 for the purpose of illustration: a first example cost function can provide a first cost that is negatively correlated to a magnitude of a first distance from the autonomous vehicle to a proximate object of interest. Thus, if a candidate motion plan approaches a proximate object of interest, the first cost increases, thereby discouraging (e.g., through increased cost penalization) the autonomous vehicle from selecting motion plans that come undesirably close to the object. This first example cost function is provided only as an example cost function to illustrate the principle of cost. The first cost function is not required to implement the present disclosure. Many other and different cost functions 304 can be employed in addition or alternatively to the first cost function described above.

Furthermore, in some implementations, the cost function(s) 304 can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

Each of the penalty/reward generator 302 and optimizer 308 can include computer logic utilized to provide desired functionality. In some implementations, each of penalty/reward generator 302 and optimizer 308 can be implemented in hardware, firmware, and/or software controlling a general purpose processor. For example, in some implementations, each of penalty/reward generator 302 and optimizer 308 includes program files stored on a storage device, loaded into a memory and executed by one or more processors. In other implementations, each of penalty/reward generator 302 and optimizer 308 includes one or more sets of computer-executable instructions that are stored in a tangible computer-readable storage medium such as RAM hard disk or optical or magnetic media.

Figure 4:
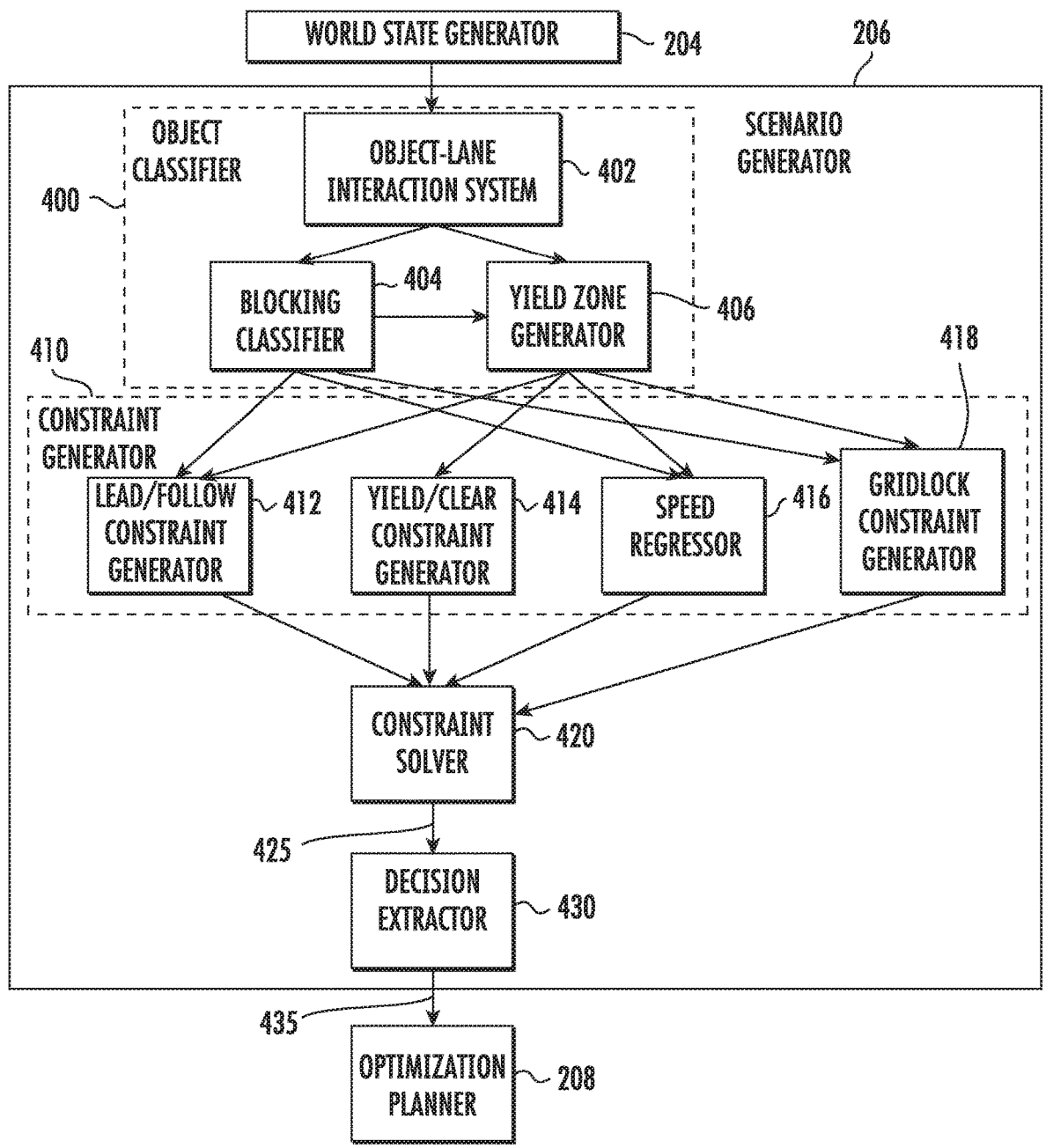
FIG. 4 depicts a block diagram of an example scenario generator according to example embodiments of the present disclosure.

FIG. 4 depicts a block diagram of more particular aspects of an example scenario generator 206 according to example embodiments of the present disclosure. In general, scenario generator 206 can be configured to make discrete decisions regarding control of an autonomous vehicle (e.g., autonomous vehicle 10) according to different driving scenarios. In some implementations, scenario generator 206 can include an object classifier 400, a constraint generator 410, a constraint solver 420, and a decision extractor 430. The output of the scenario generator 206 can correspond to a set of navigation decisions 435 that are determined relative to perceived objects and corresponding constraints. The set of navigation decisions 435 can be communicated to the optimization planner 208, which can determine a motion plan optimized over a motion planning space defined by the set of navigation decisions 435.

Figure 14:
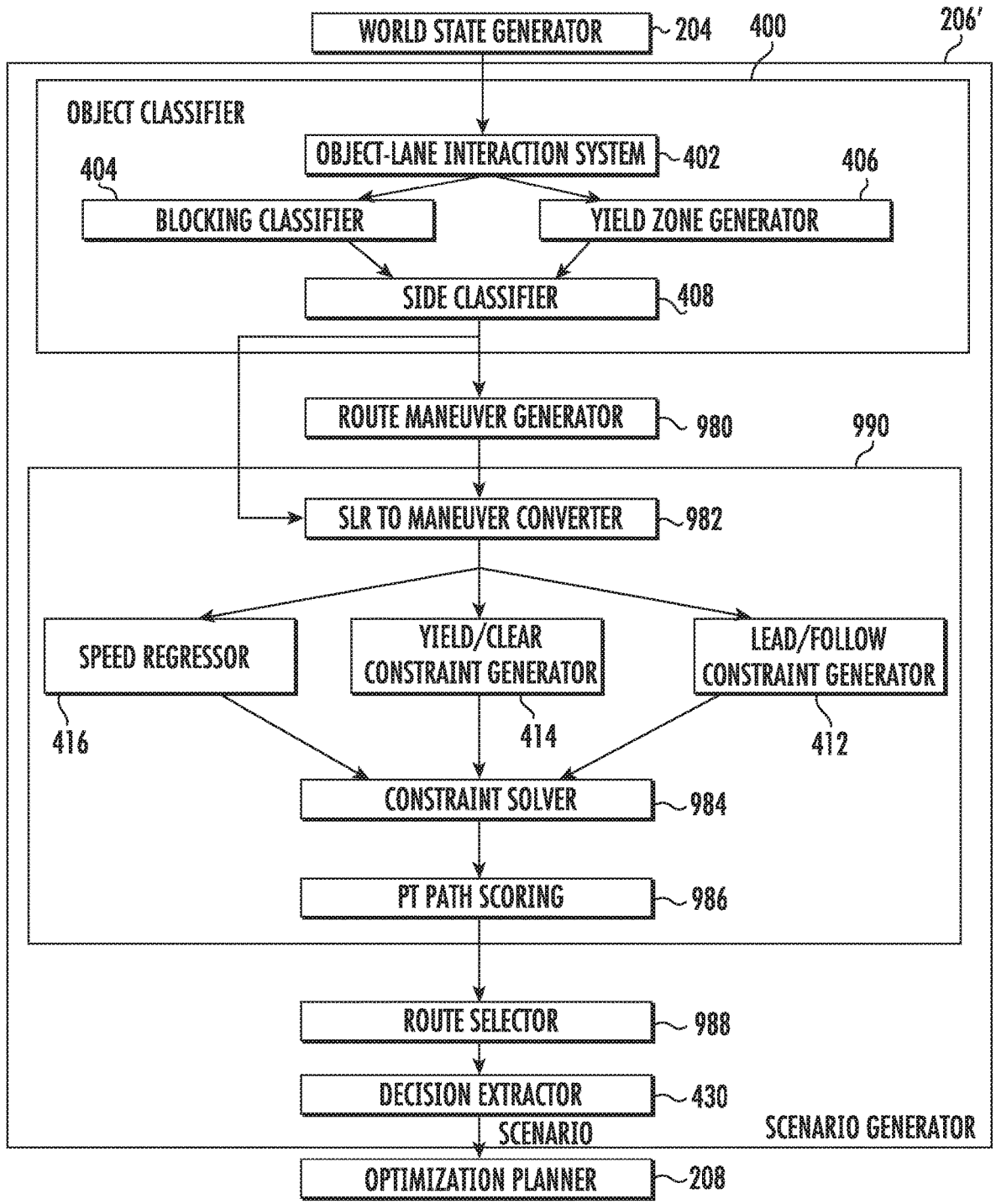
FIG. 14 depicts a block diagram of an example scenario generator when changing lanes according to example embodiments of the present disclosure.

More particularly, the object classifier 400 can include an object-lane interaction system 402 that determines one or more objects of interest (e.g., vehicles, pedestrians, bicycles, etc.) that are interacting with a lane sequence (e.g., a lane sequence that an autonomous vehicle can follow without changing lanes) associated with a nominal path for an autonomous vehicle. In some implementations, an object classifier 400 can more particularly include a blocking classifier 404, a yield zone generator 406, and a side classifier 408 (as illustrated in FIG. 14).

In some implementations, objects of interest can be identified and analyzed by object classifier 400 relative to one or more nominal paths associated with an autonomous vehicle. A nominal path, for example, may correspond to a predetermined potential path for an autonomous vehicle. As an example, in some instances, nominal paths can generally correspond to common patterns of vehicle travel along one or more lanes (e.g., lanes on a roadway or other travelway). As one example, a nominal path can generally describe a path by which a vehicle or other object may: continue according to its current lane; merge from its current lane into an adjacent lane; turn from the current lane into an adjacent road portion; or other pathways that correspond to other driving actions. In some implementations, nominal paths can be defined relative to map data associated with various roadways, road portions or segments, lanes, or the like. For example, nominal paths can be defined as a center line or other line parallel or in some predetermined relationship relative to such roadways, road portions or segments, lanes, or the like.

More particularly, an object classifier 400 can make determinations based on world state data determined by an autonomy computing system (e.g., by world state generator 204). For example, the world state generator 204 can determine one or more features associated with an object and/or the surrounding environment. For example, the features can be determined based at least in part on the state data associated with the object. In some implementations, the world state generator 204 can determine the feature(s) based at least in part on other information, such as the acquired map data (e.g., map data 118). The feature(s) can be indicative of the movement (or lack thereof) and/or position of the object relative to items within the vehicle's surroundings and/or other information associated with the object. For example, the feature(s) can include a location of the object relative to a travel way (e.g., relative to the left or right lane markings), a location of the object relative to the autonomous vehicle (e.g., a distance between the current locations of the vehicle and the object), one or more characteristic(s) of the object relative to a travel route associated with the autonomous vehicle (e.g., whether the object is moving parallel, towards, or away from the vehicle's current/future travel route or a predicted point of intersection with the vehicle's travel route), etc. In some implementations, the feature(s) determined for a particular object may depend at least in part on the class of that object. For example, the predicted path for a vehicle or bicycle traveling on a roadway may be different than that associated with a pedestrian traveling on a sidewalk. World state data that includes features associated with one or more objects of interest can also be referred to as feature data.

More particularly, in some implementations, an object classifier 400 (e.g., via object-lane interaction system 402) can be configured to determine how an object of interest is interacting with a given lane. In some implementations, objects of interest can be categorized according to one or more of a predetermined set of interaction modes, such as depicted in FIGS. 5A-5E, respectively. Example interaction modes can correspond, for instance, to tracking (e.g., tracking with an AV in a given lane), crossing (e.g., crossing in front of an AV in a given lane), entering (e.g., entering a given lane currently occupied by an AV), exiting (e.g., exiting a given lane currently occupied by an AV), oncoming (e.g., heading towards an AV in a given lane), parked (e.g., parked in a given lane occupied by an AV), etc.

In some implementations, an object classifier 400 (e.g., via side classifier 408 as depicted in FIG. 14) can be configured to determine a side of a nominal path for the AV for each object. In some implementations a side classifier 408 can be configured to determine a side of a nominal path for the AV for each object considered to be non-blocking or otherwise not contributing to a yield zone. For example, side classifier 408 can determine a parked vehicle to be on the left side of a given lane at a certain time period or a crossing pedestrian to be on the right side of a given lane at a certain time period.

More particularly, in some implementations, a blocking classifier 404 associated with an object classifier 400 can be configured to determine one or more blocking objects based at least in part on a manner of interaction that an object of interest has with a given lane or lane sequence. In some implementations, an object of interest in a given lane can be determined to be a blocking object relative to an AV operating in the same given lane when the object of interest has a manner of interaction that provides insufficient spatial clearance and/or temporal clearance for the AV to pass the object within the lane. In some implementations, an object of interest in a given lane can be determined to be a blocking object relative to an AV operating in the same given lane when the object of interest has a manner of interaction that positions the object either ahead of or behind the AV and moving with the flow of traffic.

In some implementations, a blocking classifier 404 can analyze feature data associated with objects of interest to determine one or more blocking objects. In some implementations, blocking classifier 404 can analyze feature data associated with objects of interest using one or more hard-coded rules and/or heuristics to classify each object as a blocking object or a non-blocking object. In some implementations, the blocking classifier 404 can include or otherwise access a machine-learned blocking classifier model that is trained to determine from feature data associated with an object whether to classify the object as a blocking object or a non-blocking object. In some implementations, feature data descriptive of an object (e.g., a first object) perceived by an autonomous vehicle can be obtained. The feature data can be provided as input to the machine-learned blocking classifier model, and in response, a blocking decision can be received as output of the machine-learned blocking classifier model. The blocking decision can describe the object (e.g., the first object) as a blocking object or a non-blocking object.

When an object of interest is determined by blocking classifier 404 to be a blocking object, a constraint can be generated (e.g., by constraint generator 410) for that object that requires the AV to be ahead or behind the predicted object at one or more given times. In other words, a constraint associated with a blocking object prevents an AV from being at the same longitudinal distance and time as the object within a given lane regardless of how far the AV shifts in the lateral direction within the lane. When a constraint for a blocking object is generated in a multi-dimensional space such as the path time space embodiment described relative to FIG. 8, a constraint area completely encompasses a lateral swath of the multi-dimensional space corresponding to a start and stop distance for all times that the object is blocking in a given timespan along the time dimension.

More particularly, in some implementations, a yield zone generator 406 within an object classifier 400 can be configured to determine one or more yield zones. In some implementations, yield zones can be defined as a spatial and temporal region that an AV cannot be within. For example, a yield zone can be defined for intersections such as, but not limited to traffic lights, stop signs, crosswalks, etc. In another example, yield zones can be defined relative to objects of interest that are considered to be crossing actors relative to an AV (e.g., another vehicle making an unprotected left in front of the AV, a jaywalker, another vehicle turning across the AV's current lane, etc.). When crossing actors are identified, the yield zone generator 406 can thus determine a fixed area (e.g., a fixed area defined relative to a map) for ensuring that the autonomous vehicle does not stop in the area where it perceives actors to be crossing.

In some implementations, a constraint generator 410 is configured to generate a constraint for each of the one or more objects of interest determined by the object classifier 400 (e.g., blocking objects, yield zones, etc.). Each constraint can be associated with a corresponding constraint area defined relative to a multi-dimensional space. In some implementations, the multi-dimensional space (e.g., a path time (PT) space) comprises at least a time dimension and a distance dimension relative to travel along the nominal path. Generally, each constraint area can identify regions along the nominal path that an autonomous vehicle cannot be at certain times.

In some implementations, each constraint area associated with a constraint generated by constraint generator 410 can be defined by one or more constraint sequences. Constraint sequences can be employed to generate more complex (e.g., non-linear) shapes within the multi-dimensional space (e.g., PT space). Such non-linear constraint areas can be representative of object motion/velocity that is dynamic instead of constant within the PT space. For example, if a detected object (e.g., a vehicle) is accelerating in front of the AV in the same lane as the AV, a constraint associated with the detected object can be modeled as a quadratic upward sweeping constraint in the PT space. This more complex constraint area can be approximated with a constraint sequence of linear constraints, where each successive linear constraint within the constraint sequence is sampled such that the samples are sequentially combined over a duration in time to create the constraint sequence. In the example of the detected object accelerating within the AV lane, each linear constraint successively sampled to create the constraint sequence has a different (e.g., steeper) slope than the last. In some implementations, these successive linear constraints can be sampled at a predetermined frequency (e.g. 1 Hz) for the duration of time in which the detected object is blocking the lane. In some implementations, each linear constraint that is successively sampled to create a constraint sequence can be defined by one or more of a start time when the constraint begins, a stop time when the constraint ends, a start distance along the nominal path when the constraint begins, a stop distance along the nominal path when the constraint ends, and/or a maximum velocity that an autonomous vehicle can travel through the constraint area.

In some implementations, constraints can be generated by constraint generator 410 for the time dimension corresponding to a certain time period (e.g. a ten second time period) that includes a plurality of time steps (e.g., one second time intervals or less). In some implementations, constraints are generated based on how objects are classified according to each respective time step. For example, an object can be considered a blocking object during a first time step (t0, t1) but a non-blocking object during a second time step (t1, t2). As such, at each time step during a time period, an autonomy computing system can classify an object (e.g., by determining if the object is or is not blocking a lane) and generate a corresponding constraint based on the classification.

In some implementations, the constraint generator 410 can be further configured to generate one or more buffer zones. A buffer zone can be defined relative to a constraint to provide additional areas in the multi-dimensional space for having further clearance relative to an object of interest. In some implementations, a buffer zone associated with a given constraint corresponds to an area within multi-dimensional space that surrounds at least a portion of a constraint area within the multi-dimensional space. For example, a temporal buffer zone can be created that has a start time that is before the start time of an associated constraint and/or a stop time that is after the stop time of the associated constraint. A spatial buffer zone can be created that has as start distance that is before the start distance of an associated constraint and/or a stop distance that is after the stop distance of the associated constraint.

In some implementations, the constraint generator 410 can include one or more speed regressors 416 configured to generate one or more speed zones within the multi-dimensional space. A speed zone generated by speed regressor 416 can be defined as a constraint area within multi-dimensional space in which an AV can travel, but with limitations on AV travel speed. As such, constraint areas can be defined within multi-dimensional space that control how fast an AV travels relative to specific areas in space and time (e.g., areas corresponding to other objects, areas corresponding to specific locations on a map, areas associated with a particular maneuver of the AV at a given time, etc.)

In some implementations, the constraint generator 410 can include one or more gridlock constraint generators 418. A gridlock constraint generator 418 can be configured to generate constraints for one or more keep clear areas associated with a lane sequence. Keep clear areas can be indicative of a region along a nominal path in which gridlock prevention is desired. In some implementations, intersections are included as keep clear areas, including but not limited to intersections associated with one or more traffic lights, stop signs, crosswalks, or the like. Gridlock prevention within an intersection or other keep clear area can help prevent blocking of the intersection by an autonomous vehicle entering the intersection but unable to pass through it.

More particularly, constraint generator 410 (e.g., via gridlock constraint generator 418) can be configured to generate a constraint for each keep clear area. Similar to constraints for objects of interest (e.g., constraints generated by lead/follow constraint generator 412 and/or yield/clear constraint generator 414), constraints for keep clear areas generated by gridlock constraint generator 418 can be defined as a constraint area in multi-dimensional space (e.g., a multi-dimensional space including at least a time dimension and a distance dimension relative to travel along the nominal path (e.g., PT space)). In some implementations, a gridlock constraint generated for a keep clear area by gridlock constraint generator 418 can include different first and second spatial regions. For example, a first spatial region can correspond to the entirety of an intersection, while the second spatial region can correspond to a portion of the intersection in which a current lane encounters one or more conflicting lanes (e.g., lane(s) in which potential traffic crosses that of a current lane of the autonomous vehicle). In some implementations, different scoring factors can be associated with the different first and second spatial regions such that trajectory paths determined relative to such spatial regions can be costed accordingly in a customizable fashion relative to desired action of the autonomous vehicle relative to the spatial regions of the gridlock constraint. Additional aspects of a gridlock constraint and associated spatial regions within multi-dimensional space are depicted in and described with reference to FIG. 16.

In some implementations, the scenario generator 206 can be further configured to identify navigation decisions for each of the constraints generated by the constraint generator 410 that provides a consistent solution across all constraints. For example, a constraint solver 420 can be configured to determine a low-cost trajectory path 425 that traverses through the multi-dimensional space that minimizes exposure to the constraint areas. It should be appreciated that many different methods can be utilized to determine the low-cost trajectory path 425. In one example implementation, a rollout method is employed whereby determining a low-cost trajectory path 425 through a portion of the multi-dimensional space that does not include the constraint areas includes determining a set of candidate trajectory paths through the multi-dimensional space. A score for each candidate trajectory path in the set of candidate trajectory paths can be generated, and a selected trajectory path can be determined based at least in part on the scores for each candidate trajectory path in the set of candidate trajectory paths.

With more particular reference to determining a low-cost trajectory path 425, the score generated for each candidate trajectory path can include one or more scoring factors, including but not limited to costs, discounts and/or rewards associated with aspects of a candidate trajectory path for use in evaluation of a cost function or other scoring equation. Example scoring factors can include, for example, a dynamics cost for given dynamics (e.g., jerk, acceleration) associated with the candidate trajectory path, a buffer cost associated with proximity of a candidate trajectory path to one or more constraints and/or buffer zones within the multi-dimensional space, a constraint violation cost associated with violating one or more constraints and/or buffer zones, a reward or discount for one or more achieved performance objectives (e.g., a distance traveled reward for moving forward as opposed to not moving), a blind spot cost associated with a candidate trajectory path that involves spending time in a blind spot of other actors (e.g., other vehicles). The constraint solver 420 can be configured to determine the low-cost trajectory path 425 by determining the candidate trajectory path that has a lowest total cost (or highest reward) associated with the trajectory path.

In some implementations, the scenario generator 206 can be further configured to extract a set of navigation decisions 435 from the determined trajectory path 425. For example, a decision extractor 430 can be configured to translate the trajectory path 425 into a set of navigation decisions 435 based at least in part on whether the trajectory path 425 passes above or below each constraint area associated with an object of interest within the multi-dimensional space. More particularly, in some implementations, navigation decisions within the set of navigation decisions 435 can correspond to possible actions (e.g., lead, follow, ignore, nudge, clear, yield, etc.) that an AV can take relative to an object of interest. In some implementations, the set of navigation decisions 435 relative to the one or more objects of interest can include one or more of a navigation decision to lead or follow an object of interest (e.g., another vehicle driving in a same or adjacent lane as an AV), and/or a navigation decision to yield or clear an object of interest (e.g., a pedestrian crossing the street) an intersection, or other keep clear area, and/or a navigation decision to stop or go for a traffic light. In some implementations, the scenario generator 206 can thus determine high-level decisions that correspond to or otherwise mimic human-level understanding and decision making about the surrounding environment (e.g., whether to lead or follow a particular object or whether to yield to or clear a particular object or area).

In some implementations, the decision extractor 430 can also be configured to prune a subset of constraints when a first portion of navigation decisions in the set of navigation decisions 435 renders the subset of the constraints as no longer affecting a second portion of navigation decisions in the set of navigation decisions 435. Pruning can help advantageously reduce the number of data variables ultimately provided from the scenario generator 206 to the optimization planner 208, thus also reducing processing latency at the optimization planner 208 within the motion planning system (e.g., motion planning system 105).

Once such discrete decisions have been made, the optimization planner can generate a trajectory (e.g., through local optimization over a set of appropriate cost functions) that executes or otherwise complies with the decisions made by the scenario generator 206. More particularly, for example, the set of navigation decisions 435 determined by the decision extractor 430 can be sent to the optimization planner 208 within the motion planning system (e.g., motion planning system 105). As previously described, the optimization planner 208 searches over a motion planning space to identify a motion plan that optimizes (e.g., locally optimizes) a total cost associated with the motion plan, as provided by one or more cost functions.

The motion planning space analyzed by the optimization planner 208 can be defined at least in part by the set of navigation decisions 435 determined by the scenario generator 206. As such, the optimization planner 208 can have a focused motion planning space that is consistent with the trajectory path 425 determined by the scenario generator. The motion plan determined by the optimization planner 208 can be optimized relative to multiple space dimensions (e.g., a lateral dimension associated with steering of the AV as well as a longitudinal dimension associated with braking/acceleration of the AV) for a given period of time.

FIGS. 5A-5E depict respective graphical diagrams of example scenarios for determining object-lane interaction according to example embodiments of the present disclosure. For example, the different types of object-lane interaction depicted in FIGS. 5A-5E can be determined by object classifier 400, particularly by an object-lane interaction system 402 as depicted in FIG. 4.

Figure 5E:
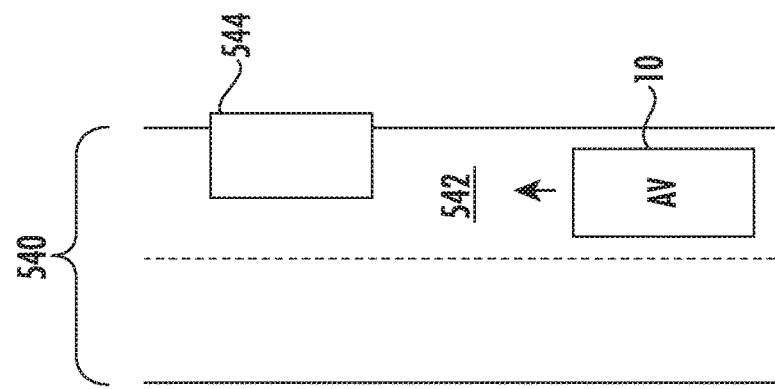
FIGS. 5A-5E depict respective graphical diagrams of example scenarios for determining object-lane interaction according to example embodiments of the present disclosure.
Figure 5D:
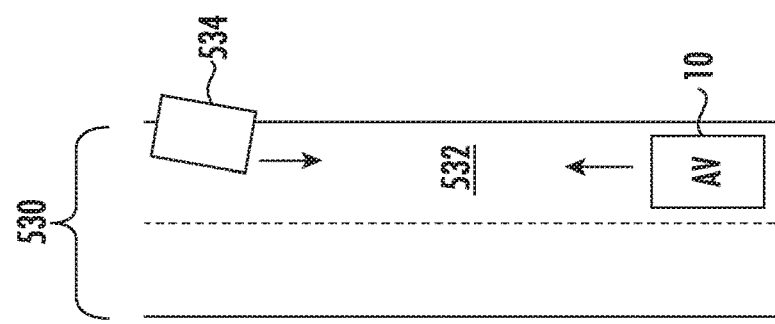
Figure 5C:
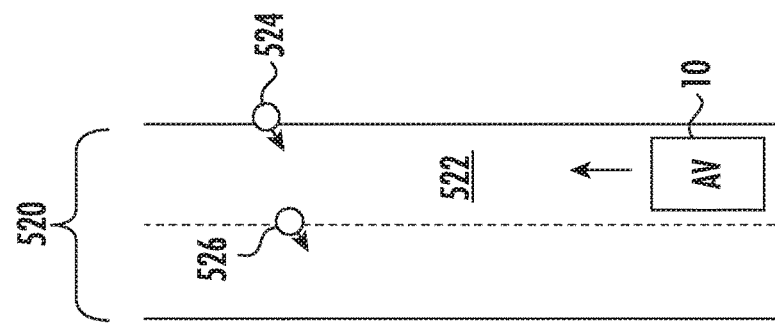
Figure 5B:
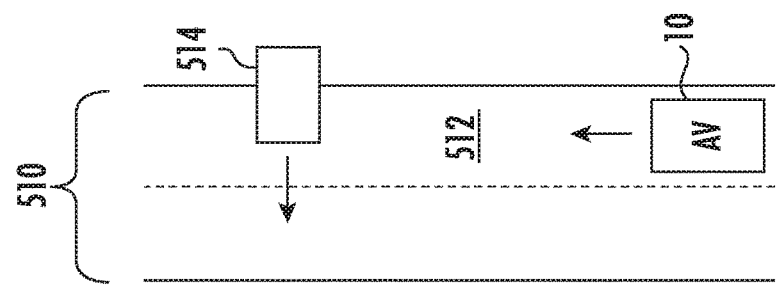
Figure 5A:
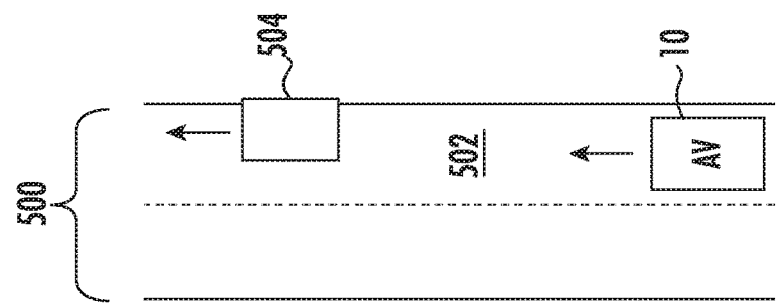

FIG. 5A illustrates an example tracking object scenario 500 in which an autonomous vehicle (AV) 10 is traveling in a lane 502 and detects another vehicle 504 tracking with a similar heading as AV 10 in the same lane 502.

FIG. 5B illustrates an example crossing object scenario 510 in which an autonomous vehicle (AV) 10 is traveling in a lane 512 and detects another vehicle 514 that has a different heading than AV 10. For instance, vehicle 514 can be determined to be crossing the lane 512.

FIG. 5C illustrates an example entering/exiting object scenario 520 in which an autonomous vehicle 10 is traveling in a lane 522 and detects an object 524 (e.g., a pedestrian) entering the lane 522. Object 526 can additionally or alternatively be detected as exiting lane 522. In some implementations, object 526 can represent the same object 524 at a different instance in time. In other implementations, object 526 can correspond to a different object than object 524 such that one object is entering lane 522 while the other object is exiting lane 522.

FIG. 5D illustrates an example oncoming object scenario 530 in which an autonomous vehicle (AV) 10 is traveling in a lane 532 and detects another vehicle 534 that has a different heading than AV 10. For instance, vehicle 534 can be determined to be traveling in an oncoming direction relative to AV 10.

FIG. 5E illustrates an example parked object scenario 540 in which an autonomous vehicle (AV) 10 is traveling in a lane 542 and detects another vehicle 544 that is parked within lane 542.

FIGS. 6A-6D depict respective graphical diagrams of example scenarios for determining blocking objects according to example embodiments of the present disclosure. For example, the different types of blocking decisions/classifications depicted in FIGS. 6A-6D can be determined by object classifier 400, particularly by a blocking classifier 404 as depicted in FIG. 4. Blocking decisions can be representative, for example, of a relationship between an object and a lane sequence of an autonomous vehicle at a current or predicted future time step. In other words, blocking decisions can help identify who has ownership of a given lane at a one or more different time steps. When an object is determined (e.g., via object classifier 410 of FIG. 4) to be a blocking object, then a constraint corresponding to the blocking object can be generated (e.g., by constraint generator 410 of FIG. 4).

Figure 6D:
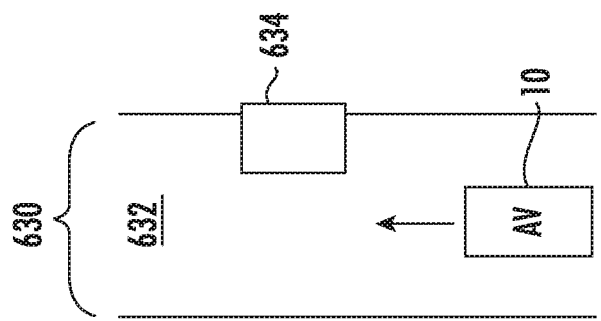
FIGS. 6A-6D depict respective graphical diagrams of example scenarios for determining blocking objects according to example embodiments of the present disclosure.
Figure 6C:
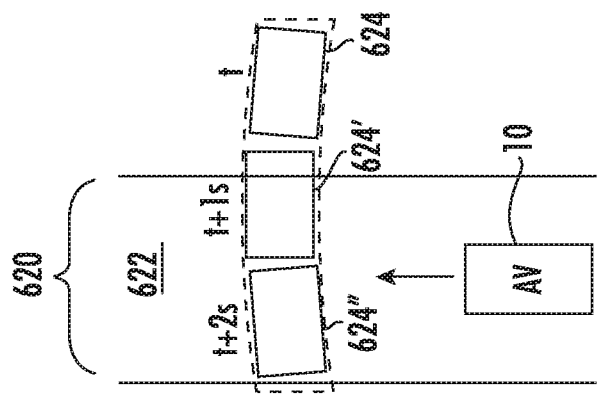
Figure 6B:
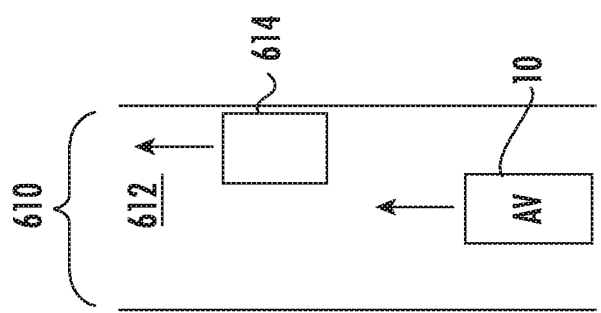
Figure 6A:
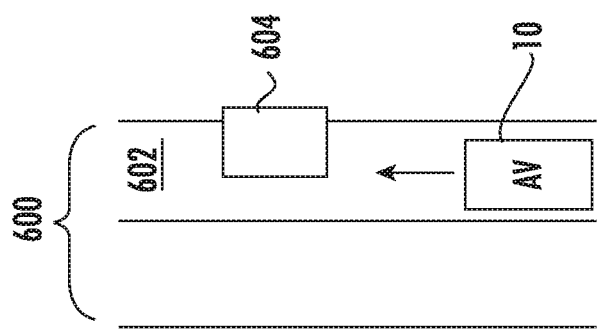

FIG. 6A illustrates an example blocking object scenario 600 in which an autonomous vehicle (AV) 10 is traveling in a lane 602 and detects a proximate object 604 (e.g., another vehicle). Object 604 is also located in the lane 602 that is occupied by the AV 10. In the example of FIG. 6A, there is insufficient spatial clearance for AV 10 to pass object 604 within lane 602. In other words, there is no way for AV 10 to go around object 604 without leaving lane 602. As such, object 604 can be determined to be a blocking object.

FIG. 6B illustrates an example blocking object scenario 610 in which an autonomous vehicle (AV) 10 is traveling in a lane 612 and detects a proximate object 614 (e.g., another vehicle) traveling in a generally same direction as AV 10. Object 614 is also located in the lane 612 that is occupied by the AV 10. Compared with lane 602 of FIG. 6A, lane 612 of FIG. 6B is much wider as is sometimes the case with wider roads encountered during driving. In such an instance with a wide lane 612, there may be sufficient spatial clearance for AV 10 to pass object 614 within lane 612. However, the AV 10 is not supposed to pass object 614 within lane 612 because of driving conventions. Because AV 10 is not supposed to pass object 614, object 614 can be determined to be a blocking object.

FIG. 6C illustrates an example blocking object scenario 620 in which an autonomous vehicle (AV) 10 is traveling in a lane 622 and detects a proximate object 624 (e.g., another vehicle) at time t. At time t, there may be sufficient spatial clearance for AV 10 to continue past object 624 while traveling in lane 622. However, object 624 can be a crossing object such that object 624' represents the same object 624 at a first subsequent time step t+1 and object 624" represents the same object 624 at a second subsequent time step t+2. At times t+1 and t+2, AV 10 would not have sufficient spatial clearance to travel past object 624/624'/624" within lane 622. As such, object 624/624'/624" can be determined to be a blocking object. As illustrated in FIG. 6C, it can sometimes be helpful to group multiple time steps for an object together in making a determination regarding whether to classify an object as a blocking object or a non-blocking object.

FIG. 6D illustrates an example non-blocking object scenario 630 in which an autonomous vehicle (AV) 10 is traveling in a lane 632 and detects a proximate object 634 (e.g., another vehicle) that is parked within the same lane 632 as AV 10. In such an instance, when a determination is made that object 634 is not moving with traffic (e.g., because it is parked), blocking classifier can determine that AV 10 is supposed to go around object 634. This determination coupled with the sufficient spatial clearance within lane 632 can result in object 634 being classified as a non-blocking object.

FIGS. 7A-7B depict respective graphical diagrams of example scenarios for determining yield zones according to example embodiments of the present disclosure. For example, the different types of yield zones depicted in FIGS.

7A-7B can be determined by object classifier 400, particularly by yield zone generator 406 as depicted in FIG. 4. When a yield zone is determined (e.g., via object classifier 410 of FIG. 4), then a constraint corresponding to the yield zone can be generated (e.g., by constraint generator 410 of FIG. 4).

FIG. 7A illustrates an example scenario 700 in which an autonomous vehicle (AV) 10 is traveling in a lane 702. An object (e.g., a pedestrian) can be detected at multiple successive time steps, as represented at 704a, 704b, 704c, and 704d, and determined to be crossing lane 702 in front of AV 10. In some implementations, the area 706 in which object 704a-d is crossing lane 702 can be identified (e.g., via map data 118) as a crosswalk. In such instance, a yield zone and corresponding constraint can be generated for area 706 corresponding to the crosswalk. Such a yield zone can help prevent AV 10 from determining a motion plan that would result in AV 10 stopping within the crosswalk area 706.

FIG. 7B illustrates an example scenario 720 in which an autonomous vehicle (AV) 10 is traveling in a lane 722. An object (e.g., a vehicle) 724 can be detected as traveling in an oncoming direction relative to AV 10 before turning to cross lane 722 at lane crossing area 726. In such instance, a yield zone and corresponding constraint can be generated for area 726 corresponding to the area in which one or more vehicles are determined as making an unprotected left relative to AV 10. Such a yield zone can help prevent AV 10 from determining a motion plan that would result in AV 10 stopping within the lane crossing area 726 in which other vehicles/objects than object 724 may also desire to cross lane 722.

Figure 8:
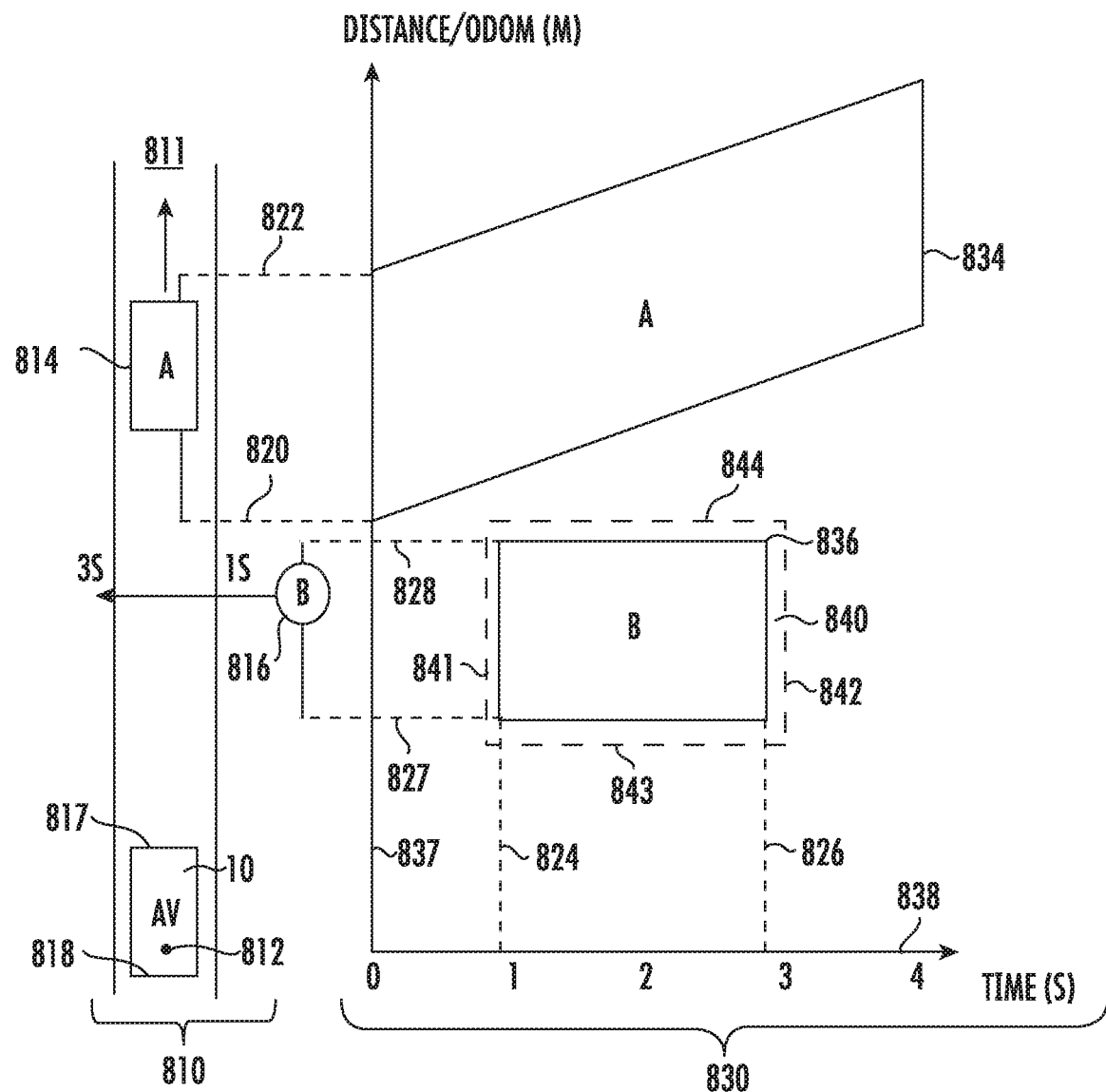
FIG. 8 depicts a graphical representation of an example multi-dimensional space for representing constraints according to example embodiments of the present disclosure.

FIG. 8 depicts a graphical representation of an example multi-dimensional space for representing constraints according to example embodiments of the present disclosure. More particularly, the left portion of FIG. 8 represents an example scenario 810 in which an autonomous vehicle 10 is traveling within a lane 811. World state data generated relative to autonomous vehicle 10 can include feature data descriptive of a first object 814 and a second object 816. Both first object 814 and second object 816 can be determined as having some sort of object-lane interaction with lane 811 which is occupied by AV 10. For example, first object 814 can be determined to be a tracking object (e.g., a vehicle traveling in the same lane 811 as AV 10 and having generally the same heading as AV 10), while second object 816 can be determined to be a crossing object (e.g., a pedestrian crossing lane 811 at one or more time steps that could interact with AV 10). Both first object 814 and second object 816 can be determined to be blocking objects at certain times.

The right portion of FIG. 8 represents an example multi-dimensional space 830 including constraint areas 834 and 836 that correspond with constraints generated for objects 814 and 816 respectively. The multi-dimensional space 830 of FIG. 8 corresponds to a space defined by a first dimension 837 corresponding to the path of AV 10 and a second dimension of 838 corresponding to time. More particularly, the first dimension 837 can be depicted as a distance or odometer measurement (e.g., in meters) relative to travel by AV 10 along a nominal path. When AV 10 is represented as point 812, the location of point 812 along the first dimension 837 (e.g., path/distance) can help define the constraints 834 and 836 relative to objects 814 and 816. The second dimension 838 can be depicted as a measurement in time (e.g., in seconds). Although FIG. 8 depicts only a portion of time (e.g., time=0 seconds until time=4 seconds), it should be appreciated that constraints can be generated for other increments or durations of time within a multi-dimensional space. In the example of FIG. 8, multi-dimensional space 830 can be considered a path-time (PT) space.

In considering how to generate constraint area 834 for first object 814, consider that object 814 corresponds to a vehicle traveling at a constant velocity ahead of AV 10 in the same lane 811 as AV 10. Based on this determination, object 814 can be considered a blocking object and will block for all time within the multi-dimensional space 830. As such, a constraint can be generated for object 814 that prevents AV 10 from being at the same longitudinal distance as object 814 within lane 811 regardless of how far the AV 10 shifts in the lateral direction within the lane 811. When constraint area 834 is generated for object 814 in the multi-dimensional space 830, constraint area 834 completely encompasses a lateral swath of the multi-dimensional space 830 corresponding to a start distance 820 and a stop distance 822 along the path dimension for all times that the object is blocking (e.g., t=[0,4]) in a given timespan along the time dimension. Because object 814 is traveling at a constant velocity, constraint area 834 is sloped upward as time progresses from t=0 to t=4 to represent movement of the object 814.

In considering how to generate constraint area 836 for second object 816, consider that second object 816 corresponds to a pedestrian B determined to be crossing lane 811 from right to left. Features describing the current state of second object 816 including a predicted trajectory can be used to determine that object 816 is going to enter the lane 811 at time t=1, at which point object 816 will be considered a blocking object. At time t=3, object 816 is predicted to exit lane 811 and will no longer be blocking lane 811. As such, constraint area 836 can be generated to represent the blocking object status of second object 816 between start time 824 (e.g., t=1) and stop time 826 (e.g., t=3). Constraint area 836 effectively prevents AV 10 from being positioned between start distance 827 and stop distance 828 from start time 824 (e.g., t=1) until stop time 826 (e.g., t=3).

For both constraint area 834 and constraint area 836, the start distance and stop distance representing such constraints are buffered to correspond to a larger size than the actual distance of first object 814 and second object 816. This is to account for the fact that AV 10 is represented as a point 812 along the dimension 837. To ensure that AV 10 does not interfere with first object 814, the start distance 820 associated with constraint area 834 is buffered to include an additional distance from the front bumper 817 of AV 10 to point 812 and stop distance 822 is buffered to include an additional distance from point 812 to the rear bumper 818 of AV 10. Similarly, to ensure that AV 10 does not interfere with second object 816, the start distance 827 associated with constraint area 836 is buffered to include an additional distance from the front bumper of AV 10 to point 812 and stop distance 828 is buffered to include an additional stop distance from point 812 to the rear bumper 818 of AV 10.

Referring still to FIG. 8, in some implementations, a constraint generator can be further configured to generate one or more buffer zones, such as buffer zone 840 defined relative to constraint area 836. Buffer zone 840 can provide an additional area in the multi-dimensional space 830 for having further clearance relative to object 816. In the example of FIG. 8, buffer zone 840 associated with constraint 836 corresponds to an area within multi-dimensional space 830 that surrounds at least a portion of constraint area 836 within the multi-dimensional space 830. For example, buffer zone 840 has a start time 841 that is before the start time 824 of constraint area 836. Buffer zone 840 provides temporal buffering by having a stop time 842 that is after the stop time 826 of constraint area 836. Buffer zone 840 also provides spatial buffering by having a start distance 843 that is before the start distance 827 of constraint area 836 and a stop distance 844 that is after the stop distance 828 of constraint area 836.

Figure 9:
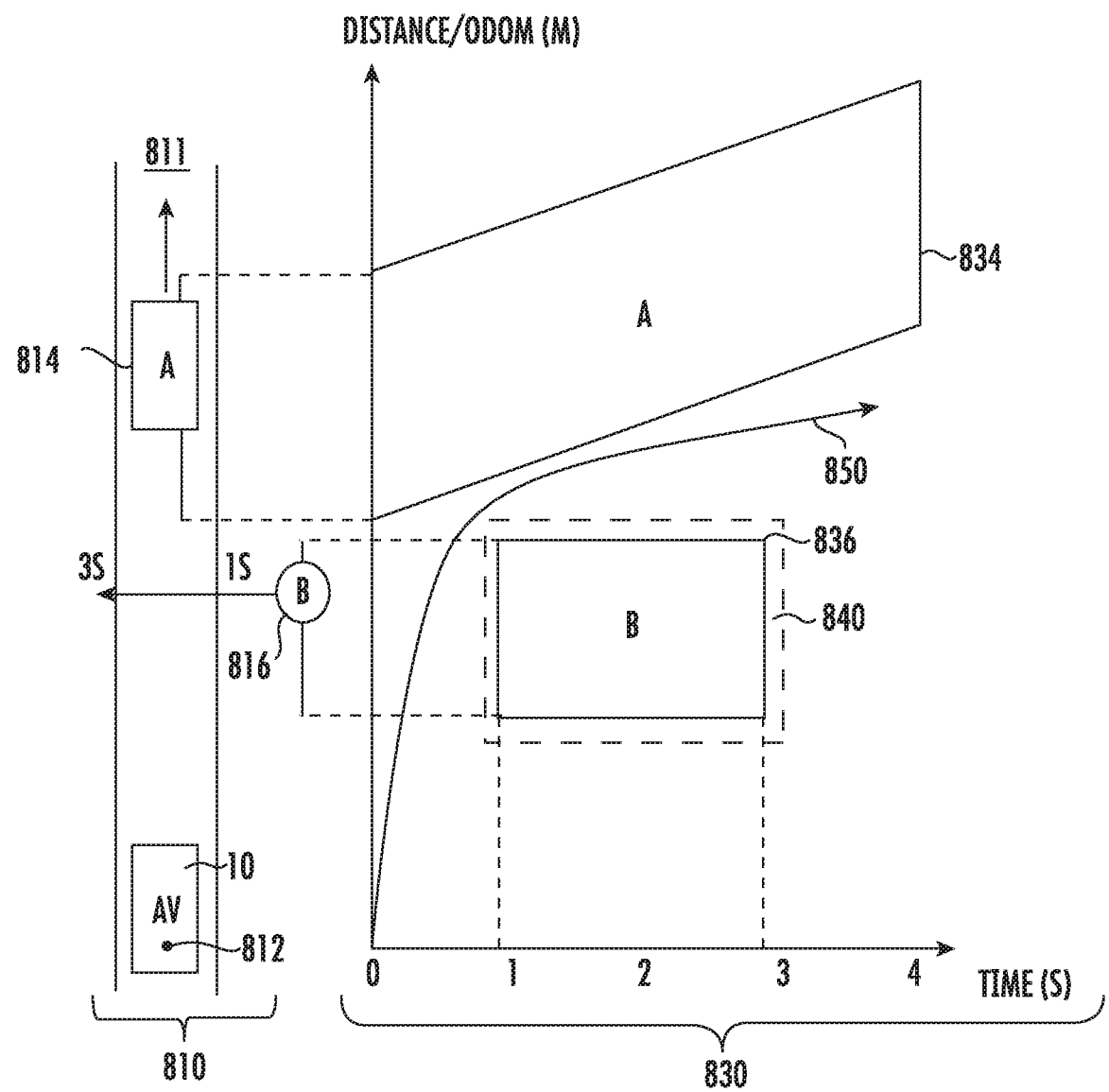
FIG. 9 depicts a graphical representation of determining an example trajectory path according to example embodiments of the present disclosure.

FIG. 9 depicts a graphical representation of determining an example trajectory path according to example embodiments of the present disclosure. More particularly, FIG. 9 depicts an example trajectory path 850 that is planned for travel by the AV 10 through the multi-dimensional space 830. Trajectory path 850 can be determined, for example, by constraint solver 420 of FIG. 4.

Trajectory path 850 starts at point (0,0) in the multi-dimensional space 830, corresponding to no distance traveled at time=0. The trajectory path can be planned to end at any predetermined future time (e.g., 10 seconds in the future), although FIG. 9 depicts a trajectory path 850 determined for a future time of 4 seconds in the future. Trajectory path 850 can be determined such that it optimizes a cost relative to the constraint areas (e.g., constraint areas 834, 836) and buffer zones (e.g., buffer zone 840) generated within the multi-dimensional space 830. For example, trajectory path 850 can be determined to be a low-cost trajectory path that minimizes exposure to constraint areas (e.g., constraint areas 834, 836) and/or buffer zones (e.g., buffer zone 840) and satisfies a cost function or other scoring function relative to multiple candidate trajectory paths. By determining a trajectory path 850 that minimizes exposure to constraint areas and/or buffer zones, a trajectory path can be determined that provides a solution that is consistent with all constraints and/or buffer zones generated within the multi-dimensional space. Because trajectory path 850 passes above constraint area 836 and below constraint area 834, a set of navigation decisions represented by trajectory path 850 would include a navigation decision to clear object 816 (e.g., to pass beyond the location of pedestrian B before time t=1) and a navigation decision to follow object 814 (e.g., to follow behind object 814 within lane 811).

Figure 10:
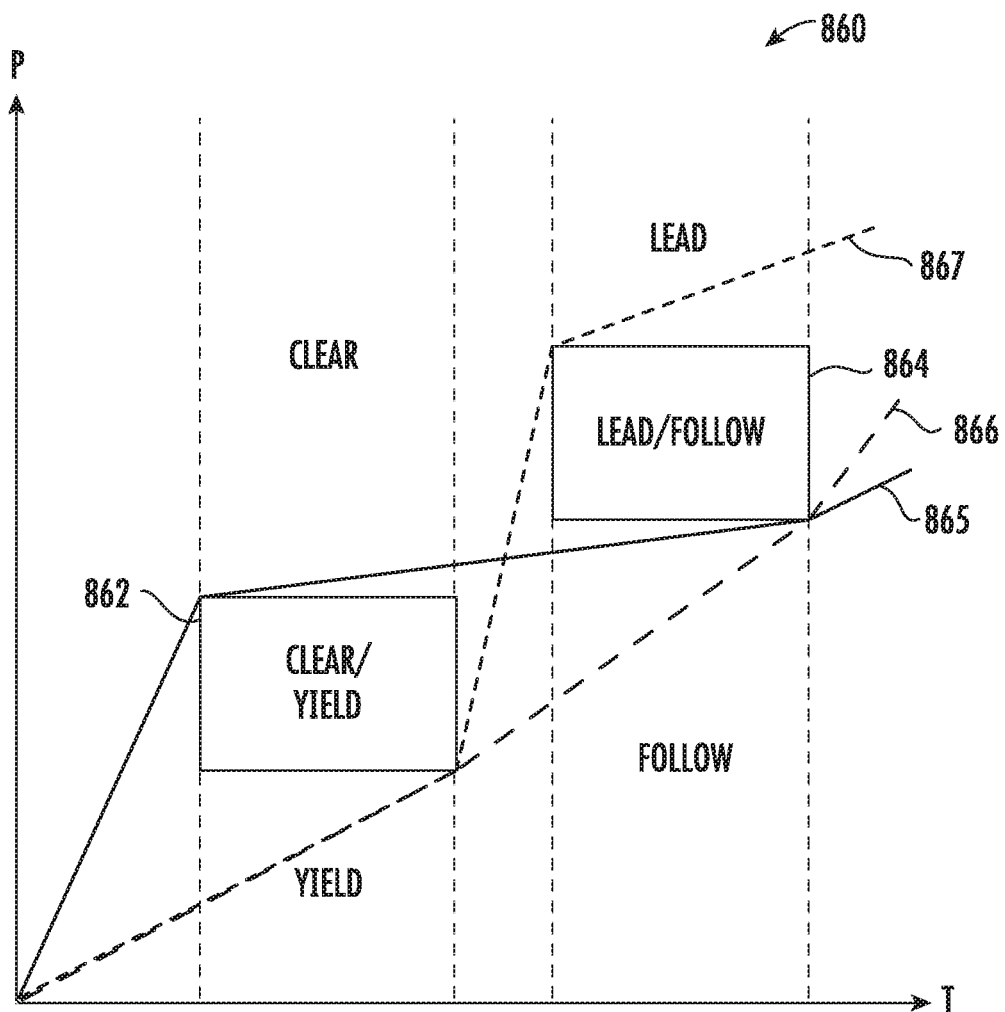
FIG. 10 depicts a graphical representation of example decision extraction according to example embodiments of the present disclosure.

FIG. 10 depicts a graphical representation of example decision extraction according to example embodiments of the present disclosure. More particularly, FIG. 10 depicts an example multi-dimensional space (e.g., PT space) 860 in which a first constraint area 862 and a second constraint area 864 corresponding to respective first and second objects are generated. Depending on how a trajectory path is generated relative to the constraints 862, 864, a different set of navigation decisions can be extracted (e.g., by a decision extractor 430 such as depicted in FIG. 4). In one example, trajectory path 865 passes above constraint area 862 and below constraint area 864. A set of navigation decisions corresponding to trajectory path 865 would include a first navigation decision to clear the object associated with constraint area 862 and a second navigation decision to follow the object associated with constraint area 864. In another example, trajectory path 866 passes below constraint area 862 and below constraint area 864. A set of navigation decisions corresponding to trajectory path 866 would include a first navigation decision to yield to the object associated with constraint area 862 and a second navigation decision to follow the object associated with constraint area 864. In yet another example, trajectory path 867 passes below constraint area 862 and above constraint area 864. A set of navigation decisions corresponding to trajectory path 867 would include a first navigation decision to yield to the object associated with constraint area 862 and a second navigation decision to lead the object associated with constraint area 864.

Figure 11:
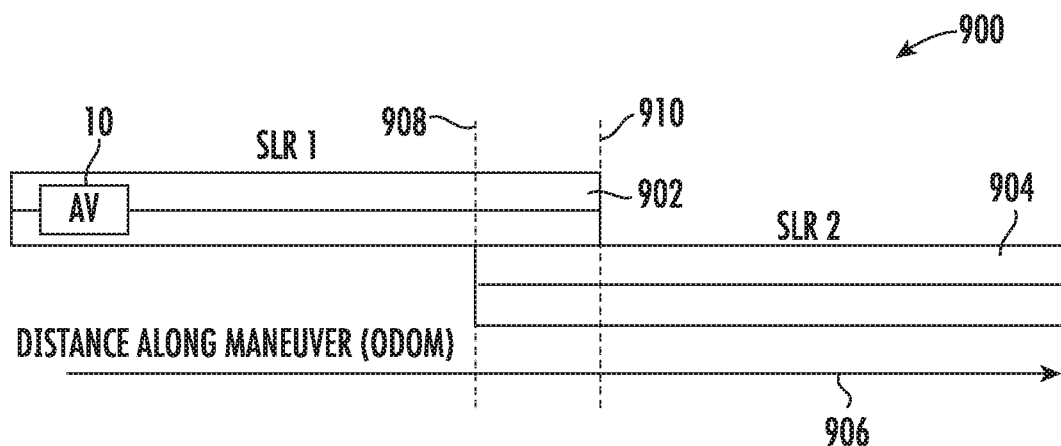
FIG. 11 depicts a graphical representation of an example autonomous vehicle lane change according to example embodiments of the present disclosure.

FIG. 11 depicts a graphical representation of an example lane change maneuver 900 for an autonomous vehicle 10 according to example embodiments of the present disclosure. Although the disclosed technology can be applied to other route maneuvers than lane changes, an ahead-of-time lane change maneuver 900 is depicted as an example implementation. In such example, lane-change maneuver 900 can be described in a relatively well-defined manner as a combination of a first stay lane route (SLR) 902 associated with a first lane and a second SLR 904 associated with a second lane. Each SLR 902, 904 can correspond to a lane sequence that can be followed without changing lanes.

Example route maneuver 900 can include an ordered sequence of SLRs 902 and 904 including metadata identifying when to occupy each set of SLRs 902 and 904 and the spatial regions to occupy during each of those times. For instance, route maneuver 900 can include data descriptive of a first phase when the AV 10 operates within the boundaries of a first lane (e.g. first SLR 902), such as AV operation before distance 908. First distance 908 is associated with when the AV 10 has partially crossed a lane boundary between the first lane (e.g., first SLR 902) and the second lane (e.g., second SLR 904) and is in transition from the first lane into the second lane. Route maneuver 900 can also include data descriptive of a second phase characterized as AV operation between first distance 908 and a second distance 910. Route maneuver 900 can also include data descriptive of a third phase (e.g., starting at distance 910) when the autonomous vehicle 10 has completely moved into the second lane (e.g., SLR 904) and operates within the boundaries of the second lane, such as AV operation after distance 910.

In some implementations, an example route maneuver 900 such as depicted in FIG. 11 can contain phase timings to allow the construction of a single PT space per route maneuver. This can sometimes provide advantages over combining multiple PT space search results together after searching the space corresponding to each temporal phase independently.

Figure 12:
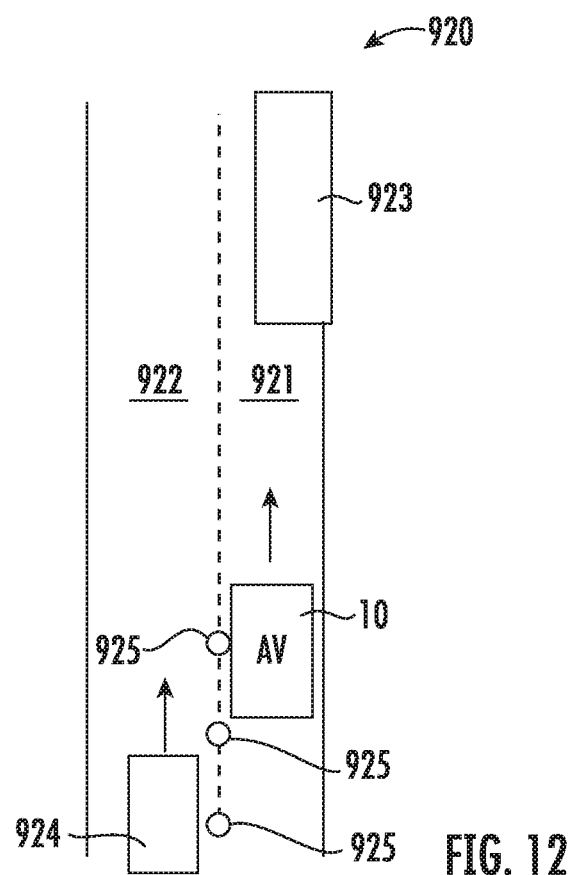
FIG. 12 depicts a graphical representation of multiple example phases of a vehicle lane change according to example embodiments of the present disclosure.
Figure 13:
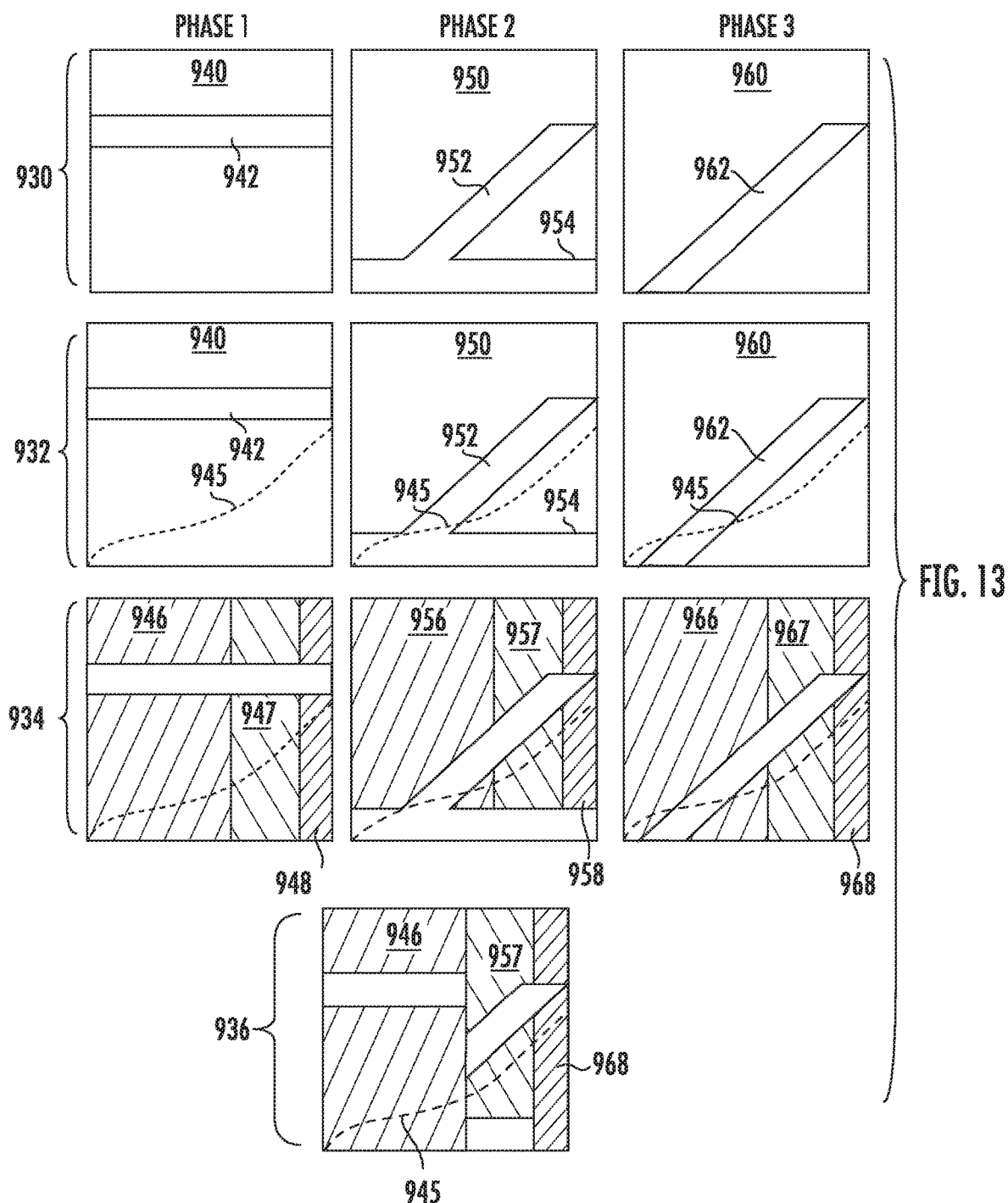
FIG. 13 depicts a graphical representation of multiple phases of a vehicle lane change in an example multi-dimensional space according to example embodiments of the present disclosure.

FIGS. 12 and 13 depict a correlated example of multiple phases of a vehicle lane change according to example embodiments of the present disclosure, and how such a lane change can be represented in multi-dimensional space.

FIG. 12 depicts an example planned lane change maneuver scenario 920 in which an AV 10 is traveling in a first lane 921 and seeking to transition from the first lane 921 on the right to second lane 922 on the left. A first object 923 (e.g., a parked truck) can be located within first lane 921, which may be the reason AV 10 desires to change lanes from first lane 921 to second lane 922. A second object 924 corresponds to a vehicle traveling in second lane 922 that is approaching the AV 10 on the left as it travels with a currently higher speed than AV 10. A set of third objects corresponds to three cones 925 that are placed between lanes 921 and 922.

FIG. 13 depicts respective sets of multi-dimensional space representations in accordance with example embodiments of the disclosed technology. For example, a first set of representations 930 corresponds to a multi-dimensional space that can be respectively determined for each phase of a plurality of different phases (e.g., first, second, and third phases) of lane change maneuver scenario 920 of FIG. 12. A second set of representations 932 additionally includes a trajectory path determined across all phases of the lane change maneuver. A third set of representations 934 depicts portions of each determined multi-dimensional space including corresponding constraints that apply to a respective timeframe associated with each phase. A fourth representation 936 corresponds to a multiplexed space that combines the respective portions of the third set of representations 934 that apply for each phase of the plurality of different phases.

Referring more particularly to FIG. 13, a first multi-dimensional space 940 corresponding to a first phase of lane change maneuver scenario 920 includes a first constraint area 942. First constraint area 942 corresponds to first object 923 (e.g., the parked truck). Since first object 923 can be determined to be a blocking object, first constraint area 942 crosses an entire lateral swath of the first multi-dimensional space 940 for all time.

A second multi-dimensional space 950 corresponding to a second phase of lane change maneuver scenario 920 includes a second constraint area 952 and a third constraint area 954. Second constraint area 952 corresponds to the second object 924 of FIG. 12 (e.g., the vehicle approaching on the left at a constant velocity greater than that of AV 10). Third constraint area 954 corresponds to the stationary set of cones 925 depicted in FIG. 12. Although not illustrated in FIG. 13, in some implementations, the second multi-dimensional space 950 can additionally include constraint areas associated with objects determined from the first phase (e.g., constraint area 942 associated with first object 923).

A third multi-dimensional space 960 corresponding to a third phase of lane change maneuver scenario 920 includes a fourth constraint area 962. Fourth constraint area 962 in the third multi-dimensional space 960 is similar to third constraint area 952 in the second multi-dimensional space 950, as both correspond to the second object 924 of FIG. 12 (e.g., the vehicle approaching on the left at a constant velocity greater than the AV 10).

In the second set of representations 932, a trajectory path 945 is depicted relative to each of the representations of multi-dimensional space 940, 950, and 960. Although trajectory path 945 does not touch any constraint areas in first multi-dimensional space 940, trajectory path 945 does touch/interfere with constraint areas depicted within the second multi-dimensional space 950 and the third multi-dimensional space 960.

To address the situation depicted in second set of representations 932, third set of representations 934 depicts portions of each determined multi-dimensional space 940, 950, 960 including corresponding constraints that apply to a respective timeframe associated with each phase. More particularly, a first portion 946 of multi-dimensional space 940 is determined as corresponding to the first phase of lane change maneuver scenario 920 of FIG. 12, while second portion 947 of multi-dimensional space 940 is determined as corresponding to the second phase of lane change maneuver scenario 920 of FIG. 12, and a third portion 948 of multi-dimensional space 940 is determined as corresponding to the third phase of lane change maneuver scenario 920 of FIG. 12. Similarly, a first portion 956 of multi-dimensional space 950 is determined as corresponding to the first phase of lane change maneuver scenario 920 of FIG. 12, while second portion 957 of multi-dimensional space 950 is determined as corresponding to the second phase of lane change maneuver scenario 920 of FIG. 12, and a third portion 958 of multi-dimensional space 950 is determined as corresponding to the third phase of lane change maneuver scenario 920 of FIG. 12. Still further, a first portion 966 of multi-dimensional space 960 is determined as corresponding to the first phase of lane change maneuver scenario 920 of FIG. 12, while second portion 967 of multi-dimensional space 960 is determined as corresponding to the second phase of lane change maneuver scenario 920 of FIG. 12, and a third portion 968 of multi-dimensional space 960 is determined as corresponding to the third phase of lane change maneuver scenario 920 of FIG. 12.

The fourth representation 936 of FIG. 13 corresponds to a multiplexed multi-dimensional space that combines respective portions of the third set of representations 934 that apply for each phase of the plurality of different phases of the lane change maneuver scenario. More particularly, fourth representation 936 includes a first portion 946 corresponding to the first phase of the lane change maneuver scenario, a second portion 957 corresponding to the second phase of the lane change maneuver scenario, and a third portion 968 corresponding to the third phase of the lane change maneuver scenario. These three portions 946, 957, and 968 can be stitched together to create the fourth representation 936. When trajectory path 945 is considered relative to the fourth representation 936, there is no interference between trajectory path 945 and the various constraint areas. A set of navigation decisions associated with trajectory path 945 in representation 936 includes a decision to stay behind the first object 923 (associated with constraint area 942), a decision to change lanes after passing cones 925 (associated with constraint area 954), and a decision to change lanes after second object 924 passes such that the AV 10 follows second object 924 (associated with constraint area 952).

FIG. 14 depicts a block diagram of an example scenario generator 206' for use with route maneuvers including multiple lanes, for instance, when changing lanes according to example embodiments of the present disclosure. Some components of scenario generator 206' are similar to those described relative to scenario generator 206 of FIG. 4, and like reference numerals are used to depict such elements. In scenario generator 206' of FIG. 14, object classifier 400 is implemented once for each sequence of successive lanes (e.g., SLRs) within a route maneuver. As such, the object-lane-interaction system 402, blocking classifier 404, yield zone generator 406, and/or side classifier 408 can be separately applied to each sequence of successive lanes. In some implementations, all distances determined by object classifier 400 can be determined relative to a start of each SLR or other predetermined lane marker as opposed to AV position.

Referring still to FIG. 14, outputs of object classifier 400 can be provided to one or more of a "Route Maneuver Generator" 980 and/or an "SLR to Maneuver Converter" 982. In some implementations, route maneuver generator 980 can be configured to receive any generated yield zones that help identify spatial and/or temporal regions that an AV cannot be within as well as states or other feature data associated with objects of interests (e.g., as determined by world state generator). In some implementations, such state data and/or feature data can be determined along a particular predicted trajectory at a specific time step. Based on such information, route maneuver generator 980 can be further configured to determine a route maneuver. In some implementations, a route maneuver can correspond to a vector representation that includes a sequence of SLRs and corresponding lane change regions to occupy, each of which links back to the associated SLRs. If the route maneuver determined by route maneuver generator 980 is a lane change, then route maneuver generator 980 can also be configured to generate phase timing information regarding when to transition from one phase to the next within the lane change sequence.

More particularly, in some implementations, route maneuver generator 980 can pre-select a number of one or more possible route maneuvers down to a subset of all possibilities. For example, in a case of two co-directed neighboring lanes with no nearby intersections, where the AV is currently staying in the lane, the expected output would be two route maneuvers: one route maneuver would represent an SLR sequence for staying in the lane while another route maneuver would represent a multi-SLR maneuver such as a lane change. SLR to maneuver converter 982 can be configured to receive route maneuver data from route maneuver generator 980 and convert such data from an SLR perspective to a maneuver space defined at least by a distance/odometer dimension. In some implementations, SLR to maneuver converter 982 can be implemented by one or more mapping functions. Constraints can then be generated relative to the route maneuver by, for example, one or more of the lead/follow constraint generator 412, the yield/clear constraint generator 414 and/or the speed regressor 416.

After constraints are generated, the constraints can be provided to a constraint solver 984, PT path scoring system 986 and route selector 988. In some examples, constraint solver 984 plans a set of feasible trajectory paths through a multi-dimensional space (e.g., path-time space) including the generated constraints associated with each maneuver. In one example implementation, constraint solver 984 employs a rollout method whereby determining a trajectory path through a portion of the multi-dimensional space that minimizes exposure to the constraint areas includes determining a set of candidate trajectory paths through the multi-dimensional space. A score for each candidate trajectory path in the set of candidate trajectory paths then can be generated by PT path scoring system 986, resulting in the best trajectory for that maneuver being chosen. In some implementations, steps executed within the constraint generator block 990 are implemented once for each possible route maneuver identified by route maneuver generator 980. The route selector 988 can then pick the best maneuver based at least in part on the score for each maneuver's best trajectory path (e.g., the low-cost trajectory path) and a relative urgency factor indicative of the relative need or preference of each maneuver (e.g., the urgency to lane change now versus staying in a current lane). As such, scenario generator 206' of FIG. 14 can be configured to implement a two-stage selection process. First, PT path scoring system 986 can determine a best trajectory path (e.g., a low-cost trajectory path) for each maneuver based in part on the best score among candidate trajectory paths. Second, route selector 988 can determine the best maneuver based on the score of its best trajectory and on the relative preference of the maneuver type (e.g., how urgent it is to change lanes). Distances and other dimensions for the constraints can be expressed within the constraint generator block with respect to AV position.

In some implementations, PT path scoring system 986 can more particularly determine a score for each candidate trajectory path, the score including one or more scoring factors, including but not limited to costs, discounts and/or rewards associated with aspects of a candidate trajectory path for use in evaluation of a cost function or other scoring equation. Example scoring factors can include, for example, a dynamics cost for given dynamics (e.g., jerk, acceleration) associated with the candidate trajectory path, a buffer cost associated with proximity of a candidate trajectory path to one or more constraints and/or buffer zones within the multi-dimensional space, a constraint violation cost associated with violating one or more constraints and/or buffer zones, a reward or discount for one or more achieved performance objectives (e.g., a distance traveled reward for moving forward as opposed to not moving), a blind spot cost associated with a candidate trajectory path that involves spending time in a blind spot of other actors (e.g., other vehicles). The route selector 988 can be configured to determine the low-cost trajectory path by determining the candidate trajectory path that has a lowest total cost (or highest reward) determined by PT path scoring system 986.

Figure 15:
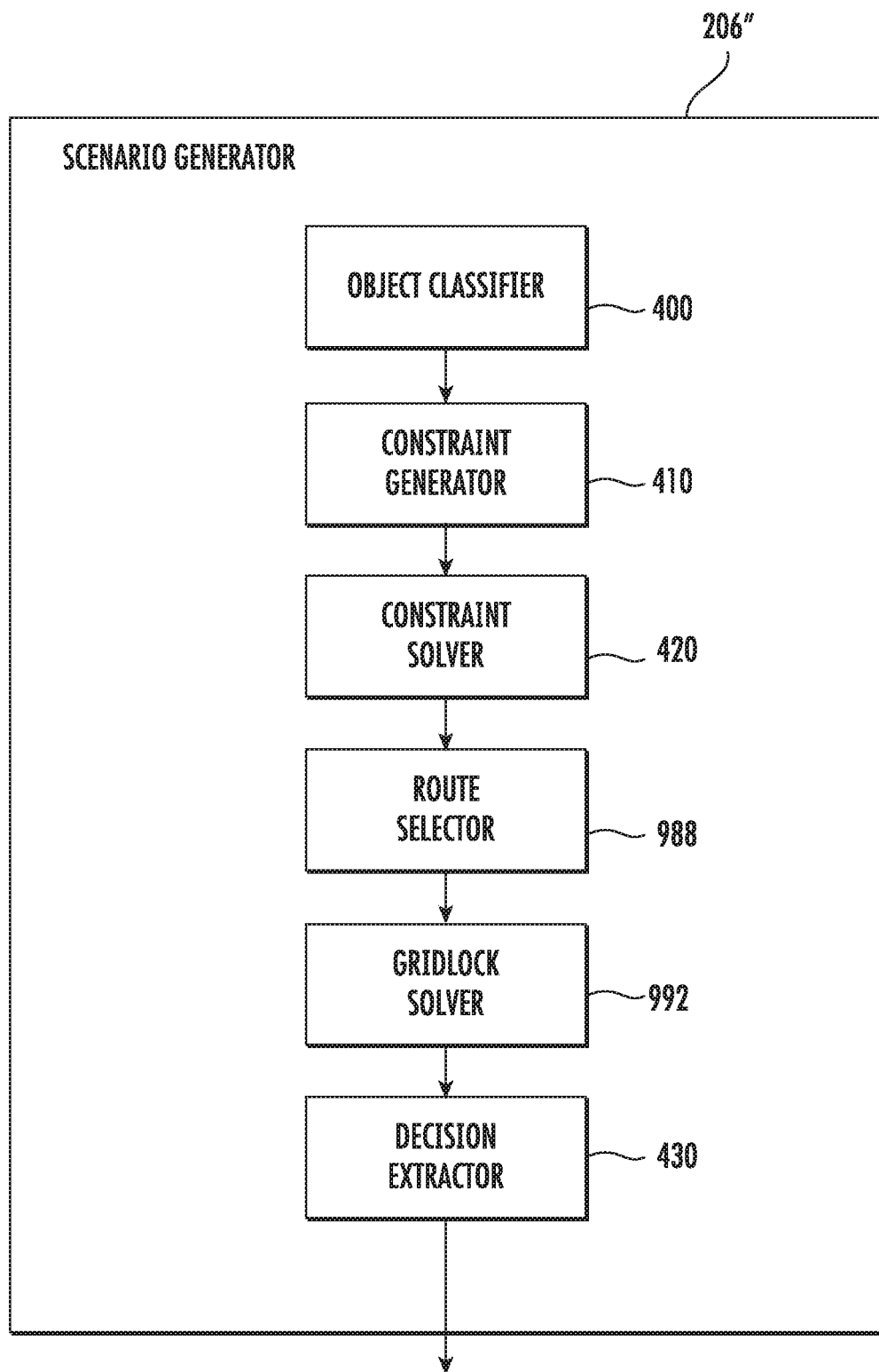
FIG. 15 depicts a block diagram of an example scenario generator including a gridlock solver according to example embodiments of the present disclosure.

FIG. 15 depicts a block diagram of an example scenario generator 206" including a gridlock solver according to example embodiments of the present disclosure. Some components of scenario generator 206" are similar to those described relative to scenario generator 206 of FIG. 4 and scenario generator 206' of FIG. 14, and like reference numerals are used to depict such elements. In FIG. 15, scenario generator 206" can include an object classifier 400, constraint generator 410, constraint solver 420, route selector 988, gridlock solver 992, and decision extractor 430.

As previously described, object classifier 400 can be configured to determine one or more objects of interest having a predetermined manner of interaction with a lane sequence associated with one or more nominal paths. Object classifier 400 (e.g., a yield zone classifier) can determine one or more keep clear areas associated with the lane sequence. Each keep clear area can be indicative of a region along the nominal path in which gridlock prevention is desired. In some implementations, determining one or more keep clear areas associated with a lane sequence corresponds to identifying one or more intersections associated with the lane sequence.

Constraint generator 410 can be configured to generate a constraint for each of the one or more objects of interest and the one or more keep clear areas determined by object classifier 400. Each constraint generated by constraint generator 410 can be defined as a constraint area in a multi-dimensional space (e.g., a PT space including at least a time dimension and a distance dimension relative to travel along the nominal path).

In some implementations, constraint generator 410 can be configured to generate a gridlock constraint for each of the one or more keep clear areas. In some implementations, constraint generator 410 can be configured to generate a gridlock constraint that includes first and second different spatial regions. In some implementations, the first and second spatial regions can be respectively associated with first and second scoring factors, wherein the first scoring factor is different than the second scoring factor. Different scoring factors can be provided to account for different degrees of gridlock, such as when some regions of an intersection are worse to block than others. An example depiction of a gridlock constraint including different first and second spatial regions is provided in FIG. 16.

Figure 16:
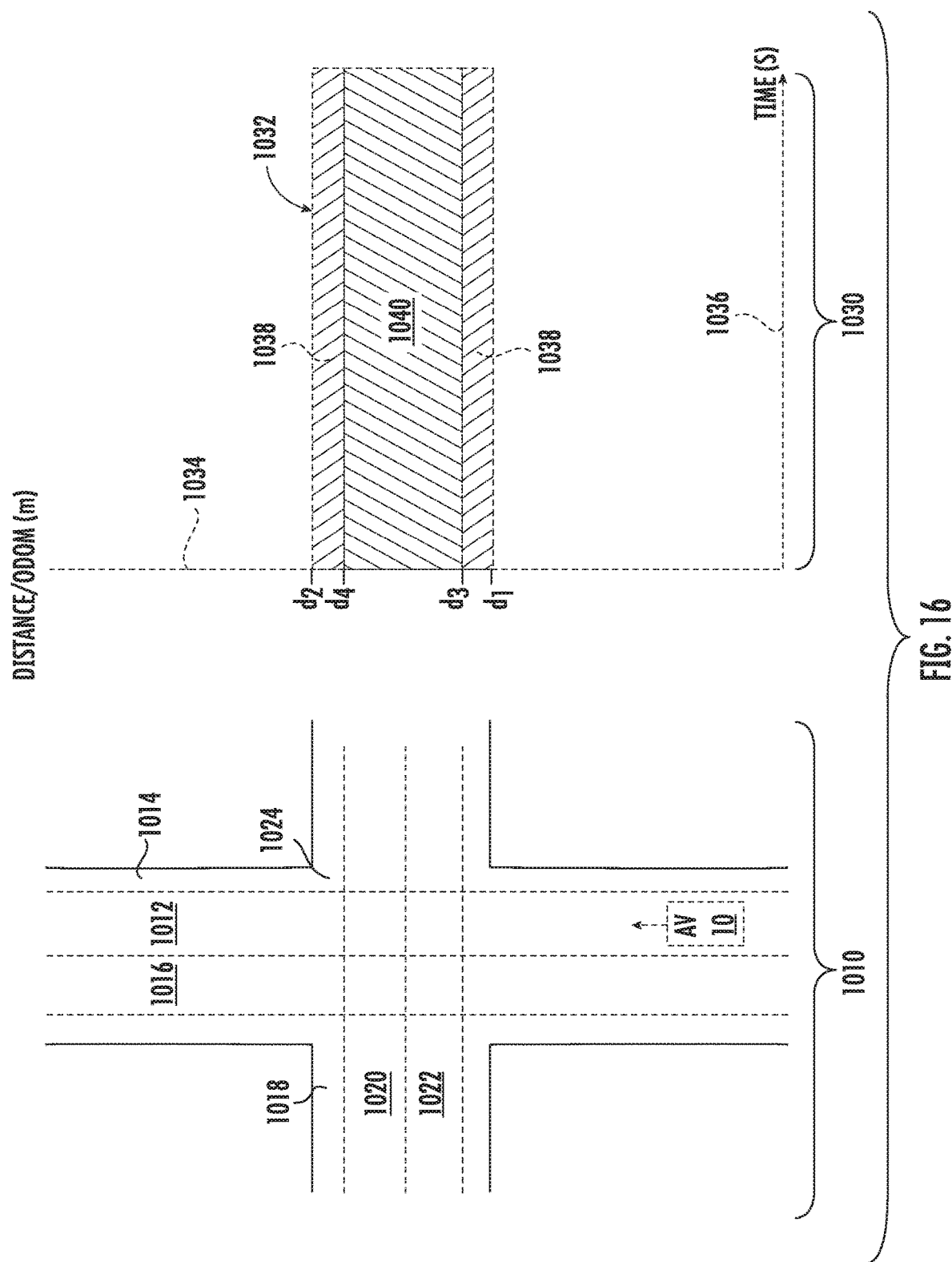
FIG. 16 depicts a graphical representation of an example multi-dimensional space including an example gridlock constraint generated for a keep clear area according to example embodiments of the present disclosure.

Referring now to FIG. 16, a graphical representation of an example multi-dimensional space including an example gridlock constraint generated for a keep clear area according to example embodiments of the present disclosure is depicted. More particularly, the left portion of FIG. 16 represents an example scenario 1010 in which an autonomous vehicle 10 is traveling within a first lane 1012 associated with a first roadway 1014. First roadway 1014 additionally includes a second lane 1016 that is configured for travel in a direction generally opposing the direction associated with first lane 1012 of first roadway 1014. Scenario 1010 also depicts a second roadway 1018 that includes a first lane 1020 and a second lane 1022. The first lane 1020 and second lane 1022 of second roadway are generally configured for travel in opposing directions from one another. In addition, both first lane 1020 and second lane 1022 of second roadway 1018 are configured to intersect with the first lane 1012 and second lane 1016 of first roadway 1014. The intersection 1024 of first roadway 1014 and second roadway 1018 can be one example of an area identified as a keep clear area in association with gridlock solver technology described herein.

The right portion of FIG. 16 represents an example multi-dimensional space 1030 including a gridlock constraint 1032 that is generated relative to intersection 1024 of scenario 1010. The multi-dimensional space 1030 of FIG. 16 corresponds to a space defined by a first dimension 1034 corresponding to the path of AV 10 and a second dimension of 1036 corresponding to time. More particularly, the first dimension 1034 can be depicted as a distance or odometer measurement (e.g., in meters) relative to travel by AV 10 along a nominal path. The second dimension 1036 can be depicted as a measurement in time (e.g., in seconds). Although FIG. 16 depicts only a portion of time, it should be appreciated that constraints can be generated for other increments or durations of time within a multi-dimensional space. In the example of FIG. 16, multi-dimensional space 1030 can be considered a path-time (PT) space.

In the example embodiment of FIG. 16, gridlock constraint 1032 can include a first spatial region 1038 and a second spatial region 1040 that is different than first spatial region 1038. The first spatial region 1038 within the multi-dimensional space 1030 can be defined at least in part by a first distance dimension value ($d_1$) associated with a first side of an intersection (e.g., intersection 1024) and a second distance dimension value ($d_2$) associated with a second side of the intersection (e.g., intersection 1024), wherein the first distance dimension value ($d_1$) is less than or equal to the second distance dimension value ($d_2$). The second spatial region 1040 within the multi-dimensional space 1030 can be defined at least in part by a third distance dimension value ($d_3$) associated with a first side of a conflicting lane (e.g., lane 1022) and a fourth distance dimension value ($d_4$) associated with a second side of a conflicting lane (e.g., lane 1020), wherein the first distance dimension value ($d_1$) is less than or equal to the third distance dimension value ($d_3$), wherein the third distance dimension value ($d_3$) is less than or equal to the fourth distance dimension value ($d_4$), and wherein the fourth distance dimension value ($d_4$) is less than or equal to the second distance dimension value ($d_2$).

Referring still to FIG. 16, sometimes the first and second spatial regions defined relative to an intersection can be determined additionally or alternatively based in part on a maximum deceleration value for AV operation relative to gridlock constraints. This maximum deceleration value can be used to help prevent an AV from implementing hard brakes for gridlock. By considering a maximum deceleration value when defining potential gridlock constraints, this means that a motion planning system can be likely to ignore gridlock constraints if an AV gets close to an intersection and is still traveling at high speed. Other constraints for objects of interest would still remain and ensure safe operation by the AV. In some implementations, the first distance dimension value ($d_1$) illustrated in FIG. 16 can be adjusted to account for the maximum deceleration value. More particularly, the first distance dimension value ($d_1$) can be optionally adjusted forward to not require more deceleration by the AV than the maximum deceleration value. If this step of adjusting the first distance dimension value ($d_1$) causes the first distance dimension value ($d_1$) to exceed the third distance dimension value ($d_3$), then the constraint generator 410 can be configured to not generate the gridlock constraint (s) for that intersection. Otherwise, a beginning of a gridlock constraint can be determined as the maximum of the start of the intersection 1024 and a distance associated with where the AV could come to a stop with moderate braking not to exceed the maximum deceleration value. Similarly, an end of the gridlock constraint can be determined as the minimum of the end of the last conflicting lane and a maximum intersection length (e.g., 50 m) past the start of the intersection 1024.

Referring still to FIG. 16, sometimes the gridlock constraints and/or rollout costing associated with first and second spatial regions can be determined additionally or alternatively based in part on a maximum intersection length relative to gridlock constraints. Intersection length can be defined as the distance between first distance dimension value ($d_1$) and second distance dimension value ($d_2$). For situations when an intersection length determined by $d_2$-$d_1$ is greater than the maximum intersection length (e.g., a value of 50 m or some other predetermined length), then it may be desirable for an AV to start crossing an intersection even if vehicles are in a part of the intersection (e.g., in a far part of the intersection closer to $d_2$). Otherwise, for relatively large intersections, a motion planning system may not attempt to cross the intersection as soon as desired.

Referring again to FIG. 15, constraint solver 420 can be configured to determine a low-cost trajectory path through a portion of the multi-dimensional space that minimizes exposure to the constraint areas determined by constraint generator 410. The low-cost trajectory path determined by constraint solver 420 can be consistent with all constraints generated for the one or more objects of interest and the one or more keep clear areas determined by the object classifier 400.

In some implementations, constraint solver 420 can be configured to determine a low-cost trajectory path through a portion of the multi-dimensional space that minimizes exposure to the constraint areas by determining a low-cost trajectory path that never includes a stop in a second spatial region associated with a gridlock constraint (e.g., second spatial region 1040 associated with gridlock constraint 1032 of FIG. 16) and that minimizes a likelihood that the low-cost trajectory path includes a stop in a first spatial region associated with a gridlock constraint (e.g., first spatial region 1038 associated with gridlock constraint 1032 of FIG. 16). In some implementations, constraint solver 420 can be configured to determine a low-cost trajectory path from a plurality of rollouts (e.g., candidate trajectory paths) by penalizing any rollout that ends in one or more of the first and second spatial regions associated with the gridlock constraint while there is also a vehicle predicted to be ahead of the AV at the end of the rollout that would prevent the AV from exiting the region(s). This latter situation could correspond, for example, to one in which a stopped vehicle is in the intersection ahead of the AV. In some implementations, different costs can be applied to the different regions/portions of an intersection. For example, a cost associated with a rollout ending in a conflicting lane can be greater than a cost associated with a rollout ending in other regions/portions of the intersection.

In some implementations, constraint solver 420 is configured to determine the low-cost trajectory path through a portion of the multi-dimensional space that minimizes exposure to the constraint areas using a rollout method as described herein. For example, constraint solver 420 can be configured to determine a set of candidate trajectory paths through the multi-dimensional space. Constraint solver 420 can be further configured to generate a score for each candidate trajectory path in the set of candidate trajectory paths and to determine the low-cost trajectory path based at least in part on the scores for each candidate trajectory path in the set of candidate trajectory paths.

Referring still to FIG. 15, route selector 988 can be included when scenario generator 206" needs to select a best maneuver from a plurality of possible maneuvers. For example, route selector 988 can help determine when it is best for an AV to implement a lane change maneuver as opposed to a maneuver that keeps the AV in its current lane. As such, when scenario generator 206" determines a plurality of possible route maneuvers, each route maneuver including a sequence of one or more successive lane sequences associated with an nominal path for an autonomous vehicle, the object classifier 400, constraint generator 410, and constraint solver 420 can be configured to run once for each possible maneuver, thus determining a low-cost trajectory path for each possible maneuver. The route selector 988 can be configured to determine a best route maneuver from the plurality of possible route maneuvers. The best route maneuver determined by route selector 988 can be determined at least in part from the low-cost trajectory path determined for each possible route maneuver and a relative urgency factor associated with each possible route maneuver (e.g., how urgent it is for the AV to change lanes at a current time).

Referring still to FIG. 15, gridlock solver 992 can be optionally included in addition to or as an alternative to including a gridlock constraint generator (e.g., gridlock constraint generator 418 of FIG. 4) within constraint generator 410. When gridlock solver 992 is included within scenario generator 206", the gridlock solver 992 can be configured to determine when the low-cost trajectory path generated by constraint solver 988 (or selected by route selector 988) includes a stop before or in a keep clear area. For example, gridlock solver can be configured to determine if a trajectory path includes a stop within gridlock constraint 1032 (e.g., one or more of the first spatial region 1038 and the second spatial region 1040) of FIG. 16. In response to such a determination, gridlock solver 992 can be further configured to generate one or more yield fences. For example, the gridlock solver 992 can be configured to generate a hard yield fence for spatial regions associated with conflicting lanes (e.g., second spatial region 1040 of FIG. 16) and/or a soft yield fence for spatial regions associated with the intersection at large (e.g., first spatial region 1038 of FIG. 16). For example, a hard yield fence can be generated at a distance dimension value determined relative to the third distance dimension value ($d_3$) and a soft yield fence can be generated at a distance dimension value determined relative to the first distance dimension value ($d_1$). These soft and hard yield fences can be used to help determine an optimized motion plan that further avoids potential gridlock in a manner that accommodates smooth acceleration/deceleration by the autonomous vehicle.

Referring still to FIG. 15, scenario generator 206" can additionally include a decision extractor 430. As previously described, decision extractor 430 can be configured to translate the low-cost trajectory path determined by constraint solver 420 into a set of navigation decisions based at least in part on whether the low-cost trajectory path passes above or below each constraint area within the multi-dimensional space. A motion plan can then be determined based at least in part on the low-cost trajectory path and/or the set of navigation decisions extracted therefrom. For example, the low-cost trajectory path generated by constraint solver 420, any hard or soft yield fences generated by gridlock solver 992, and navigation decisions extracted via decision extractor 430 can be provided to an optimization planner (e.g., optimization planner 208 of FIGS. 2-3), where a motion plan based at least in part on the low-cost trajectory path can be determined. More particularly, for example, an optimization planner can be configured to search over a motion planning space to identify the motion plan that locally optimizes a total cost associated with the motion plan as provided by one or more cost functions. Motion of the autonomous vehicle can ultimately be controlled based at least in part on the motion plan.

Figure 17:
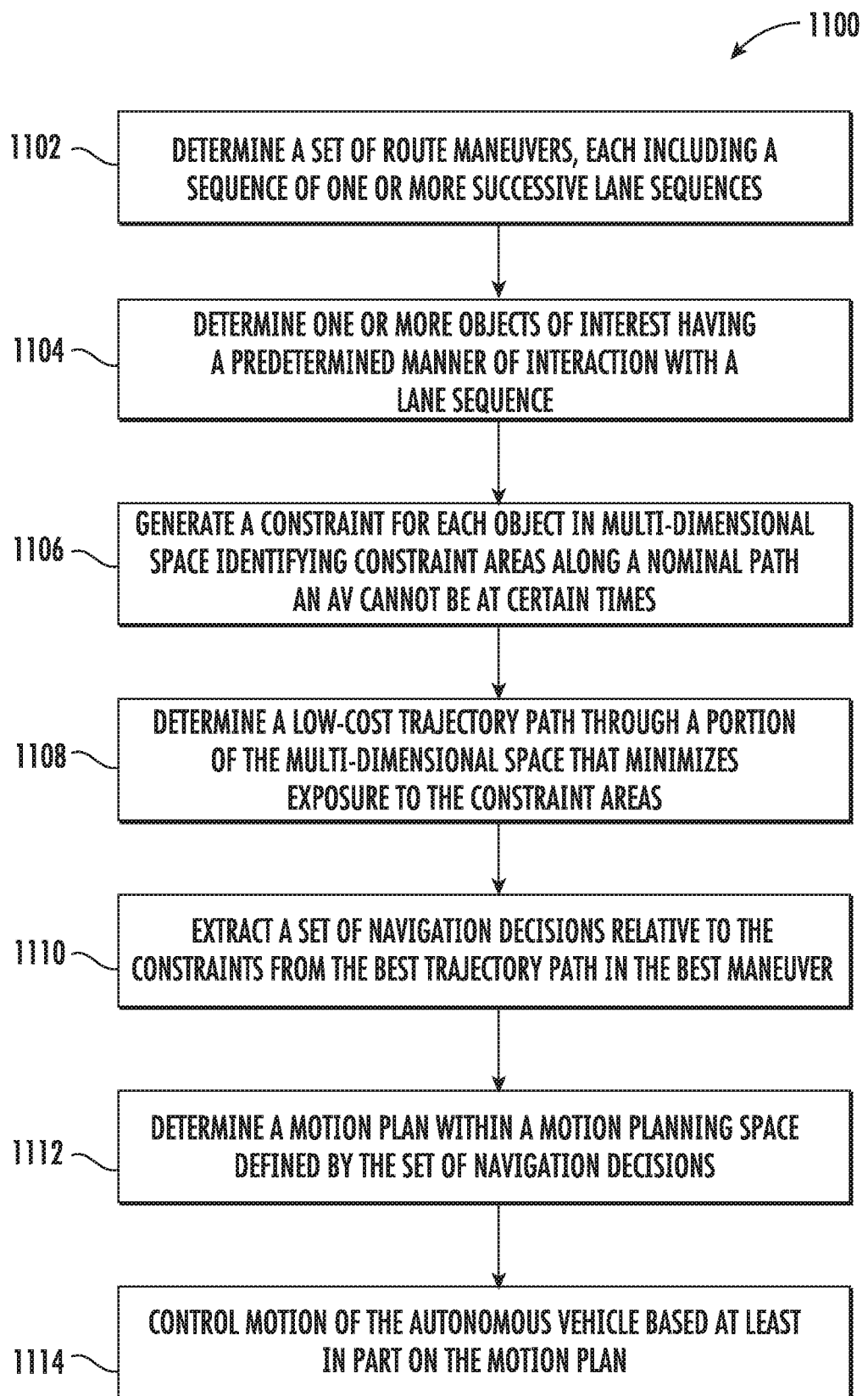
FIG. 17 depicts a flow chart diagram of a first example method of scenario generation according to example embodiments of the present disclosure.

FIG. 17 depicts a flow chart diagram of a first example method 1100 of scenario generation and motion planning according to example embodiments of the present disclosure.

At 1102, a computing system can determine a set of possible route maneuvers, each possible route maneuver including a sequence of one or more successive lane sequences.

At 1104, a computing system can determine one or more objects of interest having a predetermined manner of interaction with a lane sequence associated with a nominal path for an autonomous vehicle. In some implementations, determining one or more objects of interest that are interacting with a lane sequence is implemented for each of the one or more successive lane sequences in the route maneuver determined at 1102.

In some implementations, determining the one or more objects of interest that are interacting with a lane sequence associated with the nominal path for the autonomous vehicle at 1104 can include determining one or more blocking objects based at least in part on a manner of interaction that an object of interest has with a given lane sequence. In some implementations, determining the one or more objects of interest that are interacting with a lane sequence associated with the nominal path for the autonomous vehicle at 1104 can include determining one or more yield zones that are associated with the one or more objects of interest or with one or more fixed locations (e.g., a fixed location associated with a stop sign, a traffic light, a crosswalk, etc.) along the lane sequence. In some implementations, method 1100 can also include determining a side of the nominal path for the autonomous vehicle associated with each of the objects of interest determined to be non-blocking objects.

At 1106, a computing system can generate a constraint for each object in multi-dimensional space (e.g., objects of interest determined at 1104).

In some implementations, generating constraints at 1106 can include determining constraint areas corresponding to places along a nominal path that an AV cannot be at certain times. In some implementations, each constraint generated at 1106 is defined as a constraint area in a multi-dimensional space. In some implementations, the multi-dimensional space is defined by at least a time dimension and a distance dimension relative to travel along the nominal path. In some implementations, each constraint area can be defined as a constraint sequence of linear constraints that are successively sampled over a duration in time and sequentially combined to create the constraint sequence. Each of the linear constraints can be defined by one or more of a time when the constraint begins, a time when the constraint ends, a distance along the nominal path when the constraint begins, a distance along the nominal path when the constraint ends, and a maximum velocity that an autonomous vehicle can travel through the constraint area. In some implementations, generating constraints at 1106 can include generating a constraint within the multi-dimensional space corresponding to a speed zone indicative of limitations on travel speed for the autonomous vehicle. In some implementations, at least one buffer zone can also be generated relative to one or more of the constraints generated at 1106, each buffer zone descriptive of an additional area in the multi-dimensional space for having further clearance relative to an object of interest.

At 1108, a computing system can determine a low-cost trajectory path through a portion of multi-dimensional space that minimizes exposure to the constraint areas generated at 1106.

Figure 18:
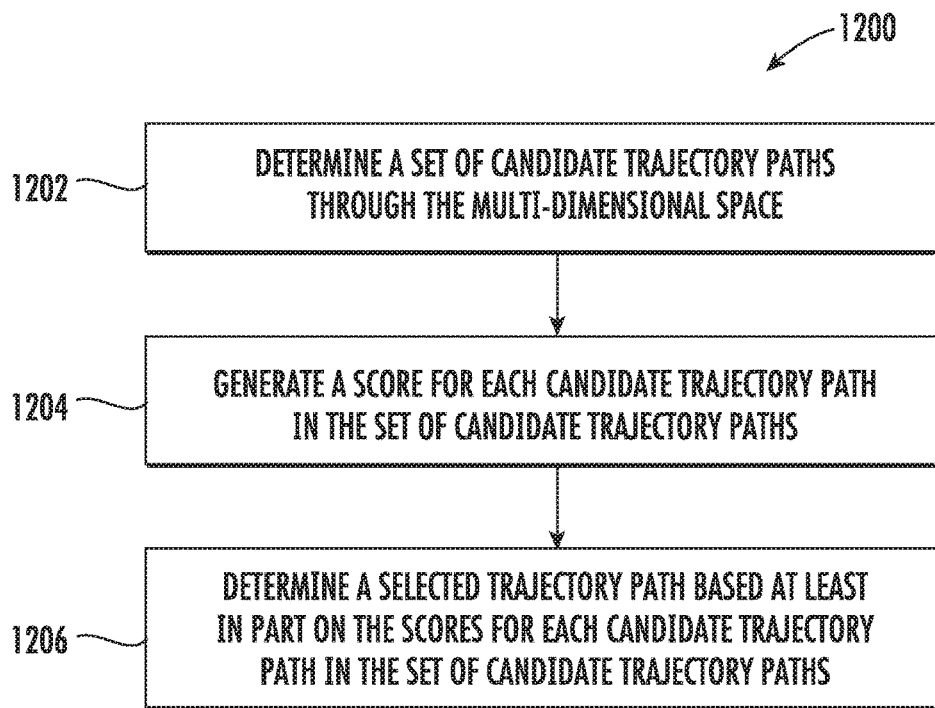
FIG. 18 depicts a flow chart diagram of an example method to determine a trajectory path according to example embodiments of the present disclosure.

Many different methods can be utilized to determine a low-cost trajectory path at 1108. In one example implementation, a rollout method is employed whereby determining a low-cost trajectory path at 1108 through a portion of the multi-dimensional space that minimizes exposure to the constraint areas includes determining a set of candidate trajectory paths through the multi-dimensional space. More particular aspects of one example method of determining a low-cost trajectory path are depicted in FIG. 18. At 1110, a computing system can extract a set of navigation decisions relative to the constraints (or corresponding objects of interest) from the best trajectory path (e.g., the low-cost trajectory path determined at 1108) in the best maneuver from the set of possible route maneuvers determined at 1102. In some implementations, the set of navigation decisions determined at 1110 are determined relative to the one or more objects of interest determined at 1104 in a manner that is consistent with all constraints generated at 1106 for the one or more objects of interest. In some implementations, extracting a set of navigation decisions at 1110 includes translating the trajectory path determined at 1108 into the set of navigation decisions based at least in part on whether the trajectory path passes above or below each constraint area associated with an object of interest within the multi-dimensional space.

In some implementations, the set of navigation decisions relative to the one or more objects of interest comprises one or more of a navigation decision to lead or follow an object of interest or a navigation decision to yield or clear an object of interest.

In some implementations, method 1100 can also include pruning a subset of the constraints generated at 1106 when a first portion of navigation decisions in the set of navigation decisions extracted at 1110 renders the subset of the constraints as no longer affecting a second portion of navigation decisions in the set of navigation decisions.

At 1112, a computing system can determine a motion plan within a motion planning space defined by the set of navigation decisions extracted at 1110.

At 1114, a computing system can control motion of the autonomous vehicle based at least in part on the motion plan determined at 1112.

As an example method to determine a trajectory path at 1108 of FIG. 17, FIG. 18 depicts a flow chart diagram of an example method 1200 according to example embodiments of the present disclosure.

In some implementations, at 1202 a computing system can determine a set of candidate trajectory paths through the multi-dimensional space. At 1204, a computing system can generate a score for each candidate trajectory path in the set of candidate trajectory paths determined at 1202. The scores generated at 1204 for each candidate trajectory path can include one or more scoring factors, including but not limited to costs, discounts and/or rewards associated with aspects of a candidate trajectory path for use in evaluation of a cost function or other scoring equation. Example scoring factors can include, for example, a dynamics cost for given dynamics (e.g., jerk, acceleration) associated with the candidate trajectory path, a buffer cost associated with proximity of a candidate trajectory path to one or more constraints and/or buffer zones within the multi-dimensional space, a constraint violation cost associated with violating one or more constraints and/or buffer zones, a reward or discount for one or more achieved performance objectives (e.g., a distance traveled reward for moving forward as opposed to not moving), a blind spot cost associated with a candidate trajectory path that involves spending time in a blind spot of other actors (e.g., other vehicles). At 1206, a computing system can determine a selected trajectory path based at least in part on the scores for each candidate trajectory path in the set of candidate trajectory paths. For example, the low-cost trajectory path can be determined at 1206 by determining the candidate trajectory path that has a lowest total cost (or highest reward) associated with the trajectory path.

Figure 19:
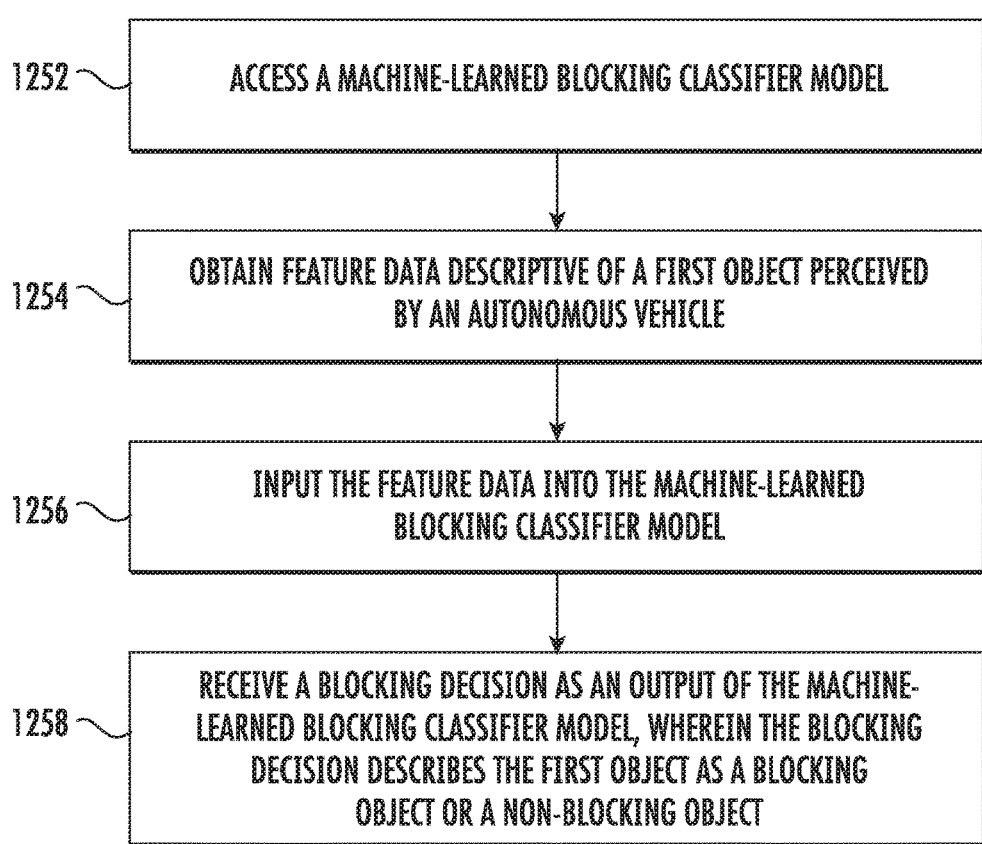
FIG. 19 depicts a flow chart diagram of an example method to determine blocking decisions according to example embodiments of the present disclosure.

As an example method to determine blocking decisions as part of determining one or more objects of interest that are interacting with a lane sequence associated with a nominal path for an autonomous vehicle at 1104, FIG. 19 depicts a flow chart diagram of an example method 1250 according to example embodiments of the present disclosure.

In some implementations, at 1252 a computing system can access a machine-learned blocking classifier model. At 1254, a computing system can obtain feature data descriptive of a first object perceived by the autonomous vehicle. At 1256, a computing system can provide the feature data obtained at 1254 as input into the machine-learned blocking classifier model accessed at 1252. At 1258, a computing system can receive a blocking decision as an output of the machine-learned blocking classifier model. In some implementations, the blocking decision can describe the first object as a blocking object or a non-blocking object.

Figure 20:
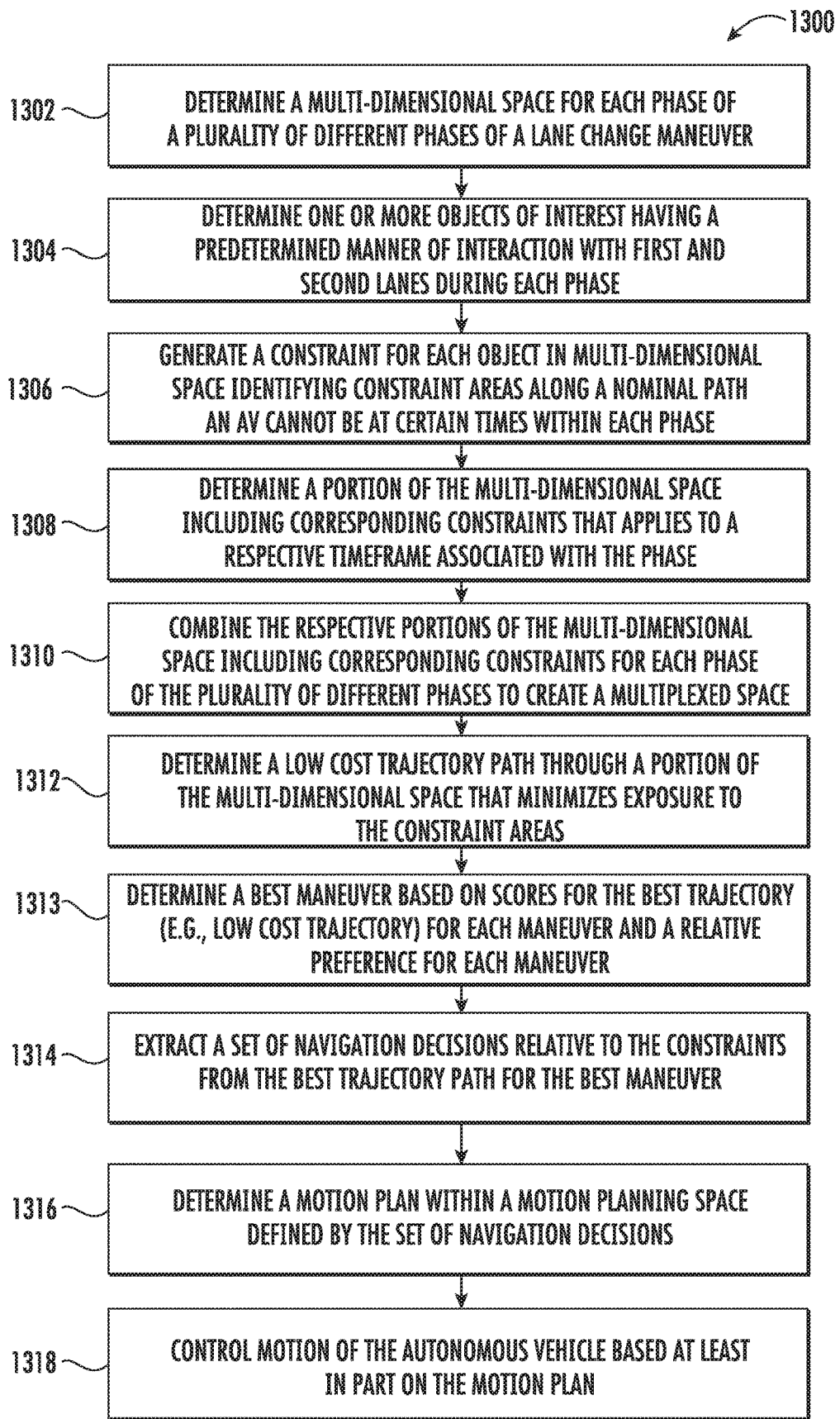
FIG. 20 depicts a flow chart diagram of a second example method of scenario generation according to example embodiments of the present disclosure.

FIG. 20 depicts a flow chart diagram of a second example method 1300 of scenario generation and related motion planning according to example embodiments of the present disclosure.

At 1302, a computing system can determine a multi-dimensional space for each phase of a plurality of different phases of a lane change maneuver. In some implementations, the plurality of different phases of the lane change maneuver include a first phase when the autonomous vehicle operates within the boundaries of the first lane, a second phase when the autonomous vehicle has partially crossed a lane boundary between the first lane and the second lane and is in transition from the first lane into the second lane, and a third phase when the autonomous vehicle has completely moved into the second lane and operates within the boundaries of the second lane. In some implementations, the multi-dimensional space for each phase of the plurality of different phases of the lane change maneuver is characterized by at least a time dimension and a distance dimension relative to travel along the nominal path.

At 1304, a computing system can determine one or more objects of interest having a predetermined manner of interaction with first and second lanes during each phase of the lane change maneuver. In some implementations, determining one or more objects of interest at 1304 can be implemented for each different phase of the lane change maneuver.

In some implementations, determining the one or more objects of interest that are interacting with one or more of the first and second lanes at 1304 can include determining one or more blocking objects based at least in part on a manner of interaction that an object of interest has with one or more of the at least first and second lanes. In some implementations, determining the one or more objects of interest that are interacting with a lane associated with the nominal path for the autonomous vehicle at 1304 can include determining one or more yield zones that are associated with the one or more objects of interest or with one or more fixed locations along the lane sequence. In some implementations, method 1300 can also include determining a side of the nominal path for the autonomous vehicle associated with each of the objects of interest determined to be non-blocking objects.

In some implementations, determining one or more blocking objects includes obtaining feature data descriptive of a first object perceived by the autonomous vehicle, inputting the feature data into a machine-learned blocking classifier model, and receiving a blocking decision as an output of the machine-learned blocking classifier model, wherein the blocking decision describes the first object as a blocking object or a non-blocking object.

At 1306, a computing system can generate a constraint for each object in multi-dimensional space identifying constraint areas along a nominal path an AV cannot be at certain times within each phase. In some implementations, generating a constraint for each object in multi-dimensional space at 1306 can be implemented for each different phase of the lane change maneuver.

In some implementations, generating constraints at 1306 can include determining constraint areas corresponding to regions along a nominal path that an AV cannot be at certain times. In some implementations, each constraint generated at 1306 is defined as a constraint area in a multi-dimensional space. In some implementations, the multi-dimensional space is defined by at least a time dimension and a distance dimension relative to travel along the nominal path. In some implementations, each constraint area can be defined by a constraint sequence of linear constraints that are successively sampled over a duration in time and sequentially combined to create the constraint sequence. Each linear constraint sampled to create the constraint sequence can be defined by one or more of a time when the constraint begins, a time when the constraint ends, a distance along the nominal path when the constraint begins, a distance along the nominal path when the constraint ends, and a maximum velocity that an autonomous vehicle can travel through the constraint area. In some implementations, generating a constraint at 1306 can include generating a constraint within the multi-dimensional space corresponding to a speed zone indicative of limitations on travel speed for the autonomous vehicle.

At 1308, a computing system can determine a portion of the multi-dimensional space including corresponding constraints that applies to a respective timeframe associated with the phase. In some implementations, determining a portion of the multi-dimensional space including corresponding constraints that applies to a respective timeframe associated with the phase at 1308 can be implemented for each different phase of the lane change maneuver.

At 1310, a computing system can combine the respective portions of the multi-dimensional space determined at 1308 including corresponding constraints generated at 1306 for each phase of the plurality of different phases to create a multiplexed space. In some implementations, combining the respective portions of the multi-dimensional space at 1310 creates a temporally multiplexed space having a first portion corresponding to the first phase, a second portion corresponding to the second phase, and a third portion corresponding to the third phase.

At 1312, a computing system can determine a low-cost trajectory path through a portion of the multiplexed multi-dimensional space created at 1310 that does not include constraint areas or that minimizes exposure to the constraint areas. In some implementations, determining a trajectory path at 1312 through the portion of the multiplexed space that minimizes exposure to the constraint areas includes determining a set of candidate trajectory paths through the multiplexed space, generating a score for each candidate trajectory path in the set of candidate trajectory paths, and determining the low-cost trajectory path based at least in part on the scores for each candidate trajectory path in the set of candidate trajectory paths. In some embodiments, determining a low-cost trajectory path at 1312 can include one or more of the features described with reference to example method 1200 of FIG. 18. In some embodiments, generating a score for each candidate trajectory path in the set of candidate trajectory paths can include penalizing any candidate trajectory path that ends in one of the keep clear areas while there is also a vehicle predicted to be ahead of the autonomous vehicle at the end of the candidate trajectory path that would prevent the autonomous vehicle from exiting the one of the keep clear areas.

At 1313, a computing system can determine a best maneuver from a plurality of possible maneuvers. As such, each of steps 1302-1312 can be implemented once for each of a plurality of possible maneuvers such that a low-cost trajectory is determined at 1312 for each maneuver in the plurality of possible maneuvers. A best maneuver is then determined at 1313 based on scores for the best trajectory (e.g., the low-cost trajectory determined at 1312) for each maneuver and a relative urgency factor associated with each maneuver. For example, a relative urgency factor can provide a quantifiable indication of the urgency of performing that particular maneuver (e.g., changing lanes or staying in a current lane).

At 1314, a computing system can extract a set of navigation decisions relative to the constraints (or corresponding objects of interest) from the best trajectory path for the best maneuver determined at 1313. In some implementations, the set of navigation decisions determined at 1314 are determined relative to the one or more objects of interest determined at 1304 in a manner that is consistent with all constraints generated at 1306 for the one or more objects of interest. In some implementations, extracting a set of navigation decisions at 1314 includes translating the best trajectory path for the best maneuver determined at 1313 into the set of navigation decisions based at least in part on whether the trajectory path passes above or below each constraint area associated with an object of interest within the multiplexed multi-dimensional space.

In some implementations, the set of navigation decisions relative to the one or more objects of interest comprises one or more of a navigation decision to lead or follow an object of interest or a navigation decision to yield or clear an object of interest.

At 1316, a computing system can determine a motion plan within a motion planning space defined by the set of navigation decisions extracted or otherwise determined at 1314.

At 1318, a computing system can control motion of the autonomous vehicle based at least in part on the motion plan determined at 1316.

Figure 21:
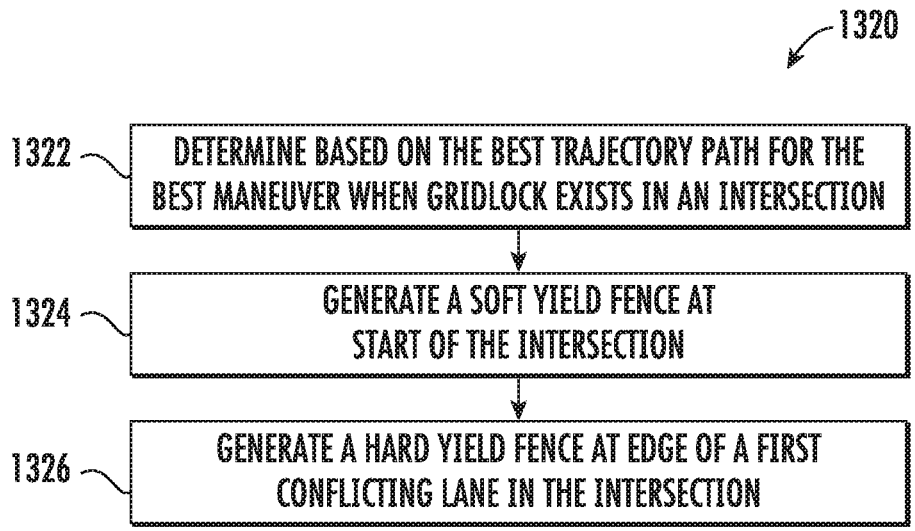
FIG. 21 depicts a flow chart diagram of a first example method of solving gridlock within scenario generation according to example embodiments of the present disclosure.

FIG. 21 depicts a flow chart diagram of a first example method 1320 of solving gridlock within scenario generation according to example embodiments of the present disclosure. For example, method 1320 can be implemented by a gridlock solver such as gridlock solver 992 of FIG. 15 or by another suitable processing component of a computing system such as but not limited to a scenario generator, such as scenario generator 206 of FIG. 4, scenario generator 206' of FIG. 14, or scenario generator 206" of FIG. 15.

At 1322, a computing system can determine based on a low-cost trajectory path (e.g., the best trajectory path determined by a route selector for the best route maneuver of a plurality of possible route maneuvers) when gridlock exists in an intersection. For example, if a low-cost trajectory path is determined to stop before or in one or more spatial regions associated with a gridlock constraint and/or keep clear area, then gridlock can be determined to exist at 1322.

In response to a determination that gridlock exists at 1322, a computing system can generate one or more yield fences. For example, at 1324, method 1320 includes generating a soft yield fence at the start of an intersection. For example, generating a soft yield fence at 1324 can correspond to generating a soft yield fence for a spatial region associated with an intersection at large (e.g., first spatial region 1038 of FIG. 16). At 1326, method 1320 can include generating a hard yield fence at the edge of a first conflicting lane in an intersection. For example, generating a hard yield fence at 1326 can include generating a hard yield fence for one or more spatial regions associated with conflicting lanes (e.g., second spatial region 1040 of FIG. 16) With reference to the example spatial regions depicted in FIG. 16, generating a soft yield fence at 1324 can correspond to generating a soft yield fence at a distance dimension value determined relative to the first distance dimension value ($d_1$) and generating a hard yield fence at 1326 can correspond to generating a hard yield fence at a distance dimension value determined relative to the third distance dimension value ($d_3$). These soft and hard yield fences can be used to help determine an optimized motion plan that further avoids potential gridlock in a manner that accommodates smooth acceleration/deceleration by the autonomous vehicle.

Figure 22:
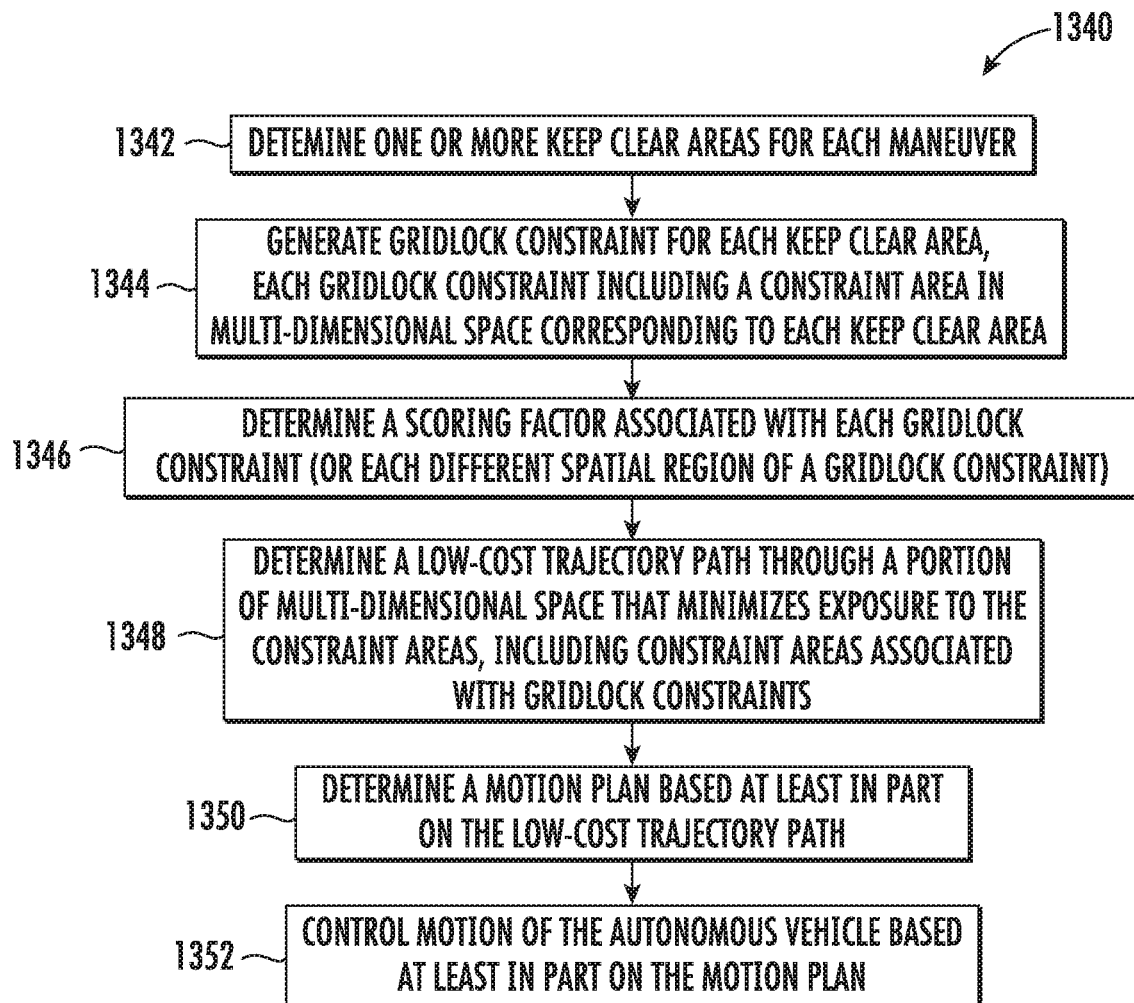
FIG. 22 depicts a flow chart diagram of a second example method of solving gridlock within scenario generation according to example embodiments of the present disclosure.

FIG. 22 depicts a flow chart diagram of a second example method 1340 of solving gridlock within scenario generation according to example embodiments of the present disclosure. For example, method 1340 can be implemented by any suitable processing component(s) of a computing system such as but not limited to a scenario generator, such as scenario generator 206 of FIG. 4, scenario generator 206' of FIG. 14, or scenario generator 206" of FIG. 15. Example method 1340 of FIG. 22 can be implemented additionally or alternatively relative to method 1320 of FIG. 21.

At 1342, method 1340 can include determining one or more keep clear areas for each maneuver (e.g., each route maneuver of a plurality of route maneuvers evaluated by a constraint generator). For example, determining one or more keep clear areas at 1340 can include determining one or more keep clear areas associated with a lane sequence, each keep clear area indicative of a region along a nominal path for an AV in which gridlock prevention is desired. In some implementations, determining one or more keep clear areas associated with a lane sequence at 1342 includes identifying one or more intersections associated with the lane sequence.

At 1344, method 1340 can include generating a constraint for each of the one or more keep clear areas, wherein each constraint is defined as a constraint area in a multi-dimensional space. In some implementations, the multi-dimensional space in which gridlock constraints are generated at 1344 includes at least a time dimension and a distance dimension relative to travel along the nominal path. In some implementations, generating a gridlock constraint at 1344 includes generating one or more different spatial regions. For example, generating a gridlock constraint at 1344 can include generating a first spatial region within the multi-dimensional space defined at least in part by a first distance dimension value associated with a first side of an intersection and a second distance dimension value associated with a second side of the intersection, wherein the first distance dimension value is less than or equal to the second distance dimension value. In addition, generating a gridlock constraint at 1344 can include generating a second spatial region within the multi-dimensional space defined at least in part by a third distance dimension value associated with a first side of a conflicting lane and a fourth distance dimension value associated with a second side of a conflicting lane. In some implementations, the first distance dimension value can be less than or equal to the third distance dimension value, the third distance dimension value can be less than or equal to the fourth distance dimension value, and the fourth distance dimension value can be less than or equal to the second distance dimension value. In some implementations, the first distance dimension value comprises a maximum of a distance associated with a first side of the intersection and a distance associated with where the autonomous vehicle could come to a stop without exceeding a maximum deceleration value.

At 1346, method 1340 can include determining a scoring factor associated with each gridlock constraint (or alternatively with each different spatial region of a gridlock constraint). For example, when a gridlock constraint has first and second different spatial regions associated therewith, determining a scoring factor at 1346 can include determining a first scoring factor associated with the first spatial region and a second scoring factor associated with the second spatial region, wherein the first scoring factor is different than the second scoring factor. For example, in some implementations one or more of the first scoring factor and second scoring factor can be configured to implement a cost that reduces a likelihood of a trajectory path stopping in the first spatial region and or second spatial region. In some implementations, the second scoring factor can be configured to implement a high cost that effectively prevents a trajectory path from stopping in the second spatial region, thus preventing an AV from stopping in a conflicting lane and potentially causing gridlock.

At 1348, method 1340 can include determining a low-cost trajectory path through a portion of the multi-dimensional space that minimizes exposure to the constraint areas and that is consistent with all constraint areas (e.g., constraint areas associated with objects of interest and/or areas of interest such as intersections and the like as well as constraint areas associated with gridlock constraints). In some implementations, determining a low-cost trajectory path at 1348 can include minimizing a likelihood that the low-cost trajectory path includes a stop in one or more of a first spatial region and/or a second spatial region associated with each keep clear area and corresponding gridlock constraint.

In some implementations, determining a low-cost trajectory path at 1348 through a portion of the multi-dimensional space that minimizes exposure to the constraint areas can include determining a low-cost trajectory path that never includes a stop in the second spatial region and that minimizes a likelihood that the low-cost trajectory path includes a stop in the first spatial region.

In some implementations, determining a low-cost trajectory path at 1348 can include implementing a rollout approach in which a set of candidate trajectory paths through the multi-dimensional space is determined. A score for each candidate trajectory path in the set of candidate trajectory paths can be determined, and the low-cost trajectory path can be determined based at least in part on the scores for each candidate trajectory path in the set of candidate trajectory paths.

In some implementations, steps 1342 through 1348 can be implemented once for each of a plurality of possible maneuvers that are determined. Each possible route maneuver can be a sequence of one or more successive lane sequences associated with a nominal path for the autonomous vehicle at a given time. A best route maneuver can then be determined from the plurality of possible route maneuvers. In some implementations, the best route maneuver can be determined at least in part from the low-cost trajectory path determined for each possible route maneuver and a relative urgency factor associated with each possible route maneuver.

At 1350, method 1340 can include determining a motion plan based at least in part on the low-cost trajectory path determined at 1348. In some implementations, determining a motion plan at 1350 can include translating the low-cost trajectory path determined at 1348 into a set of navigation decisions based at least in part on whether the low-cost trajectory path passes above or below each constraint area within the multi-dimensional space. In addition, determining a motion plan at 1350 can include searching over a motion planning space to identify the motion plan that locally optimizes a total cost associated with the motion plan as provided by one or more cost functions.

At 1352, method 1340 can include controlling motion of the autonomous vehicle based at least in part on the motion plan determined at 1350.

FIG. 23 depicts a block diagram of an example computing system 1400 according to example embodiments of the present disclosure. The example system 1400 includes an autonomy computing system 102 and a machine learning computing system 1430 that are communicatively coupled over a network 1470.

In some implementations, the autonomy computing system 102 can implement a scenario generator or otherwise control the motion of an autonomous vehicle (e.g., autonomous vehicle 10). In some implementations, the autonomy computing system 102 can be included in an autonomous vehicle. For example, the autonomy computing system 102 can be on-board the autonomous vehicle. In other implementations, the autonomy computing system 102 is not located on-board the autonomous vehicle. The autonomy computing system 102 can include one or more distinct physical computing devices.

The autonomy computing system 102 includes one or more processors 1412 and a memory 1414. The one or more processors 1412 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 1414 can include one or more non-transitory computer-readable storage media, such as RAM, ROM, EEPROM, EPROM, one or more memory devices, flash memory devices, etc., and combinations thereof.

The memory 1414 can store information that can be accessed by the one or more processors 1412. For instance, the memory 1414 (e.g., one or more non-transitory computer-readable storage mediums, memory devices) can store data 1416 that can be obtained, received, accessed, written, manipulated, created, and/or stored. The data 1416 can include, for instance, feature data as described herein. In some implementations, the autonomy computing system 102 can obtain data from one or more memory device(s) that are remote from the system 102.

The memory 1414 can also store computer-readable instructions 1418 that can be executed by the one or more processors 1412. The instructions 1418 can be software written in any suitable programming language or can be implemented in hardware. Additionally, or alternatively, the instructions 1418 can be executed in logically and/or virtually separate threads on processor(s) 1412.

For example, the memory 1414 can store instructions 1418 that when executed by the one or more processors 1412 cause the one or more processors 1412 to perform any of the operations and/or functions described herein, including, for example, some or all of the operations described with reference to method 1100 of FIG. 17, method 1200 of FIG. 18, method 1250 of FIG. 19, method 1300 of FIG. 20, method 1320 of FIG. 21, and/or method 1340 of FIG. 22.

According to an aspect of the present disclosure, the autonomy computing system 102 can store or include one or more machine-learned models 1422. As examples, the machine-learned models 1422 can be or can otherwise include various machine-learned models such as, for example, neural networks (e.g., deep neural networks), support vector machines, decision tree-based models (e.g., random forests), ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the autonomy computing system 102 can receive the one or more machine-learned models 1422 from the machine learning computing system 1430 over network 1470 and can store the one or more machine-learned models 1422 in the memory 1414. The autonomy computing system 102 can then use or otherwise implement the one or more machine-learned models 1422 (e.g., by processor(s) 1412). In particular, the autonomy computing system 102 can implement the machine learned model(s) 1422 to generate blocking decisions for objects of interest.

The machine learning computing system 1430 includes one or more processors 1432 and a memory 1434. The one or more processors 1432 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 1434 can include one or more non-transitory computer-readable storage media, such as RAM, ROM, EEPROM, EPROM, one or more memory devices, flash memory devices, etc., and combinations thereof.

The memory 1434 can store information that can be accessed by the one or more processors 1432. For instance, the memory 1434 (e.g., one or more non-transitory computer-readable storage mediums, memory devices) can store data 1436 that can be obtained, received, accessed, written, manipulated, created, and/or stored. The data 1436 can include, for instance, feature data as described herein. In some implementations, the machine learning computing system 1430 can obtain data from one or more memory device(s) that are remote from the system 1430.

The memory 1434 can also store computer-readable instructions 1438 that can be executed by the one or more processors 1432. The instructions 1438 can be software written in any suitable programming language or can be implemented in hardware. Additionally, or alternatively, the instructions 1438 can be executed in logically and/or virtually separate threads on processor(s) 1432.

For example, the memory 1434 can store instructions 1438 that when executed by the one or more processors 1432 cause the one or more processors 1432 to perform any of the operations and/or functions described herein, including, for example, some or all of the operations described with reference to method 1100 of FIG. 17, method 1200 of FIG. 18, method 1250 of FIG. 19, method 1300 of FIG. 20, method 1320 of FIG. 21, and/or method 1340 of FIG. 22.

In some implementations, the machine learning computing system 1430 includes one or more server computing devices. If the machine learning computing system 1430 includes multiple server computing devices, such server computing devices can operate according to various computing architectures, including, for example, sequential computing architectures, parallel computing architectures, or some combination thereof.

In addition or alternatively to the model(s) 1422 at the autonomy computing system 102, the machine learning computing system 1430 can include one or more machine-learned models 1442. As examples, the machine-learned models 1442 can be or can otherwise include various machine-learned models such as, for example, neural networks (e.g., deep neural networks), support vector machines, decision tree-based models (e.g., random forests), ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1430 can communicate with the autonomy computing system 102 according to a client-server relationship. For example, the machine learning computing system 1430 can implement the machine-learned models 1442 to provide a web service to the computing system 102. For example, the web service can provide blocking decisions.

Thus, machine-learned models 1422 can be located and used at the autonomy computing system 102 and/or machine-learned models 1442 can be located and used at the machine learning computing system 1430.

In some implementations, the machine learning computing system 1430 and/or the autonomy computing system 102 can train the machine-learned models 1422 and/or 1442 through use of a model trainer 1450. The model trainer 1450 can train the machine-learned models 1422 and/or 1442 using one or more training or learning algorithms. One example training technique is backwards propagation of errors. In some implementations, the model trainer 1450 can perform supervised training techniques using a set of labeled training data. In other implementations, the model trainer 1450 can perform unsupervised training techniques using a set of unlabeled training data. The model trainer 1450 can perform a number of generalization techniques to improve the generalization capability of the models being trained. Generalization techniques include weight decays, dropouts, or other techniques.

The model trainer 1450 can be implemented in hardware, firmware, and/or software controlling one or more processors. For example, in some implementations, model trainer 1450 includes program files stored on a storage device, loaded into a memory and executed by one or more processors. In other implementations, model trainer 1450 includes one or more sets of computer-executable instructions that are stored in a tangible computer-readable storage medium such as RAM hard disk or optical or magnetic media.

In particular, the model trainer 1450 can train a machine-learned model 1422 and/or 1442 based on a set of training data 1452. The training data 1452 can include, for example log data annotated with blocking labels. The log data can describe blocking decisions determined by vehicles (e.g., autonomous vehicles and/or humanly-operated vehicles) during previously conducted real-world driving sessions. As another example, training data 1452 can include synthesized blocking decisions generated by playing forward or otherwise simulating certain scenarios that are described by log data.

Referring still to FIG. 23, the autonomy computing system 102 can also include a network interface 1420 used to communicate with one or more systems or devices, including systems or devices that are remotely located from the computing system 102. The network interface 1420 can include any circuits, components, software, etc. for communicating with one or more networks (e.g., 1470). In some implementations, the network interface 1420 can include, for example, one or more of a communications controller, receiver, transceiver, transmitter, port, conductors, software and/or hardware for communicating data. Similarly, the machine learning computing system 1430 can include a network interface 1440.

The network(s) 1470 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1470 can be accomplished, for instance, via a network interface using any type of protocol, protection scheme, encoding, format, packaging, etc.

FIG. 23 illustrates one example computing system 1400 that can be used to implement the present disclosure. Other computing systems can be used as well. For example, in some implementations, the autonomy computing system 102 can include the model trainer 1450 and the training dataset 1452. In such implementations, the machine-learned models 1422 can be both trained and used locally at the computing system 102. As another example, in some implementations, the autonomy computing system 102 is not connected to other computing systems.

In addition, components illustrated and/or discussed as being included in one of the computing systems 102 or 1430 can instead be included in another of the computing systems 102 or 1430. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 17-22 respectively depict steps performed in a particular order for purposes of illustration and discussion, the methods of the present disclosure are not limited to the particularly illustrated order or arrangement. The various steps of the methods 1100, 1200, 1250, 1300, 1320, and 1340 can be omitted, rearranged, combined, and/or adapted in various ways without deviating from the scope of the present disclosure.

What is claimed is:

1. A computer-implemented method, comprising:
   determining, by a computing system that comprises one or more computing devices, one or more objects of interest having a predetermined manner of interaction with a lane sequence associated with a nominal path for an autonomous vehicle;
   determining, by the computing system, one or more keep clear areas associated with the lane sequence, each keep clear area indicative of a region along the nominal path in which gridlock prevention is desired;
   generating, by the computing system, a constraint for each of the one or more objects of interest and the one or more keep clear areas, wherein each constraint is defined as a constraint area in a multi-dimensional space;
   determining, by the computing system, a low-cost trajectory path through a portion of the multi-dimensional space that minimizes exposure to the constraint areas and that is consistent with all constraints generated for the one or more objects of interest and the one or more keep clear areas, wherein determining the low-cost trajectory path through the portion of the multi-dimensional space that minimizes exposure to the constraint areas comprises
      determining, by the computing system, a set of candidate trajectory paths through the multi-dimensional space,
      generating, by the computing system, a score for each candidate trajectory path in the set of candidate trajectory paths, and
      determining, by the computing system, the low-cost trajectory path based at least in part on the scores for each candidate trajectory path in the set of candidate trajectory paths;
   determining, by the computing system, a motion plan based at least in part on the low-cost trajectory path; and
   controlling, by the computing system, motion of the autonomous vehicle based at least in part on the motion plan.

2. The computer-implemented method of claim 1, wherein determining one or more keep clear areas associated with the lane sequence comprises identifying one or more intersections associated with the lane sequence.

3. The computer-implemented method of claim 2, wherein:
   the multi-dimensional space comprises at least a time dimension and a distance dimension relative to travel along the nominal path; and
   generating a constraint for each of the one or more keep clear areas comprises generating a first spatial region within the multi-dimensional space defined at least in part by a first distance dimension value associated with a first side of an intersection and a second distance dimension value associated with a second side of the intersection, wherein the first distance dimension value is less than or equal to the second distance dimension value.

4. The computer-implemented method of claim 3, wherein the first distance dimension value comprises a maximum of a distance associated with the first side of the intersection and a distance associated with where the autonomous vehicle could come to a stop without exceeding a maximum deceleration value.

5. The computer-implemented method of claim 3, wherein generating a constraint for each of the one or more keep clear areas comprises generating a second spatial region within the multi-dimensional space defined at least in part by a third distance dimension value associated with a first side of a conflicting lane and a fourth distance dimension value associated with a second side of a conflicting lane, wherein the first distance dimension value is less than or equal to the third distance dimension value, wherein the third distance dimension value is less than or equal to the fourth distance dimension value, and wherein the fourth distance dimension value is less than or equal to the second distance dimension value.

6. The computer-implemented method of claim 5, further comprising determining a first scoring factor associated with the first spatial region and a second scoring factor associated with the second spatial region, wherein the first scoring factor is different than the second scoring factor; and wherein determining a low-cost trajectory path through a portion of the multi-dimensional space that minimizes exposure to the constraint areas comprises minimizing a likelihood that the low-cost trajectory path comprises a stop in one or more of the first spatial region and the second spatial region.

7. The computer-implemented method of claim 6, wherein determining a low-cost trajectory path through a portion of the multi-dimensional space that minimizes exposure to the constraint areas comprises determining a low-cost trajectory path that never comprises a stop in the second spatial region and that minimizes a likelihood that the low-cost trajectory path comprises a stop in the first spatial region.

8. The computer-implemented method of claim 6, further comprising:

determining, by the computing system, that the low-cost trajectory path comprises a stop before or in one or more of the first spatial region and the second spatial region; and in response to determining that the low-cost trajectory path comprises a stop before or in one or more of the first spatial region and the second spatial region, generating, by the computing system, a hard yield fence at a distance dimension value determined relative to the third distance dimension value and a soft yield fence at a distance dimension value determined relative to the first distance dimension value.

9. The computer-implemented method of claim 1, wherein generating, by the computing system, a score for each candidate trajectory path in the set of candidate trajectory paths comprises penalizing any candidate trajectory path that ends in one of the keep clear areas while there is also a vehicle predicted to be ahead of the autonomous vehicle at the end of the candidate trajectory path that would prevent the autonomous vehicle from exiting the one of the keep clear areas.

10. The computer-implemented method of claim 1, wherein determining, by the computing system, a motion plan based at least in part on the low-cost trajectory path comprises:

translating, by the computing system, the low-cost trajectory path into a set of navigation decisions based at least in part on whether the low-cost trajectory path passes above or below each constraint area within the multi-dimensional space; and searching, by the computing system, over a motion planning space to identify the motion plan that locally optimizes a total cost associated with the motion plan as provided by one or more cost functions.

11. A computing system that controls an autonomous vehicle, the computing system comprising:

one or more processors; and one or more non-transitory computer-readable media that collectively store instructions that, when executed by the one or more processors, cause the computing system to perform operations, the operations comprising:

determining one or more keep clear areas associated with a lane sequence associated with a nominal path for an autonomous vehicle, each keep clear area indicative of a region along the nominal path in which gridlock prevention is desired;

generating a constraint for each of the one or more keep clear areas, wherein each constraint is defined as a constraint area in a multi-dimensional space, the multi-dimensional space comprising at least a time dimension and a distance dimension relative to travel along the nominal path;

determining a low-cost trajectory path through a portion of the multi-dimensional space that minimizes exposure to the constraint areas and that is consistent with all constraints generated for the one or more keep clear areas, wherein determining the low-cost trajectory path through the portion of the multi-dimensional space that minimizes exposure to the constraint areas comprises determining a set of candidate trajectory paths through the multi-dimensional space, generating a score for each candidate trajectory path in the set of candidate trajectory paths, and determining the low-cost trajectory path based at least in part on the scores for each candidate trajectory path in the set of candidate trajectory path;

determining a motion plan based at least in part on the low-cost trajectory path; and controlling motion of the autonomous vehicle based at least in part on the motion plan.

12. The computing system of claim 11, the operations further comprising:

determining one or more objects of interest having a predetermined manner of interaction with the lane sequence associated with the nominal path; and generating a constraint for each of the one or more objects of interest; and wherein determining a low-cost trajectory path through a portion of the multi-dimensional space further minimizes exposure to the constraint areas generated for the one or more objects of interest.

13. The computing system of claim 11, wherein determining one or more keep clear areas associated with the lane sequence comprises identifying one or more intersections associated with the lane sequence.

14. The computing system of claim 11, wherein generating a constraint for each of the one or more keep clear areas comprises generating a first spatial region within the multi-dimensional space defined at least in part by a first distance dimension value associated with a first side of an intersection and a second distance dimension value associated with a second side of the intersection, wherein the first distance dimension value is less than or equal to the second distance dimension value.

15. The computing system of claim 14, wherein generating a constraint for each of the one or more keep clear areas comprises generating a second spatial region within the multi-dimensional space defined at least in part by a third distance dimension value associated with a first side of a conflicting lane and a fourth distance dimension value associated with a second side of a conflicting lane, wherein the first distance dimension value is less than or equal to the third distance dimension value, wherein the third distance dimension value is less than or equal to the fourth distance dimension value, and wherein the fourth distance dimension value is less than or equal to the second distance dimension value.

16. The computing system of claim 15, the operations further comprising determining a first scoring factor associated with the first spatial region and a second scoring factor associated with the second spatial region, wherein the first scoring factor is different than the second scoring factor; and wherein determining a low-cost trajectory path through a portion of the multi-dimensional space that minimizes exposure to the constraint areas comprises minimizing a likelihood that the low-cost trajectory path comprises a stop in one or more of the first spatial region and the second spatial region.

17. The computing system of claim 15, wherein determining a low-cost trajectory path through a portion of the multi-dimensional space that minimizes exposure to the constraint areas comprises determining a low-cost trajectory path that never comprises a stop in the second spatial region and that minimizes a likelihood that the low-cost trajectory path comprises a stop in the first spatial region.

18. An autonomous vehicle, comprising:

one or more processors; and one or more non-transitory computer-readable media that collectively store instructions that, when executed by the one or more processors, cause the one or more processors to perform operations, the operations comprising:

determining one or more objects of interest having a predetermined manner of interaction with a lane sequence associated with a nominal path for an autonomous vehicle;

determining one or more keep clear areas associated with the lane sequence, each keep clear area indicative of a region along the nominal path in which gridlock prevention is desired;

generating a constraint for each of the one or more objects of interest and the one or more keep clear areas, wherein each constraint is defined as a constraint area in a multi-dimensional space, wherein the constraint area associated with each keep clear area comprises a first spatial region associated with a first scoring factor and a second spatial region associated with a second scoring factor, wherein the first scoring factor and the second scoring factor are different;

determining a low-cost trajectory path through a portion of the multi-dimensional space that minimizes exposure to the constraint areas and that is consistent with all constraints generated for the one or more objects of interest and the one or more keep clear areas, wherein determining the low-cost trajectory path through the portion of the multi-dimensional space that minimizes exposure to the constraint areas comprises determining a set of candidate trajectory paths through the multi-dimensional space, generating a score for each candidate trajectory path in the set of candidate trajectory paths, and determining the low-cost trajectory path based at least in part on the scores for each candidate trajectory path in the set of candidate trajectory path;

determining a motion plan based at least in part on the low-cost trajectory path; and controlling motion of the autonomous vehicle based at least in part on the motion plan.

19. The autonomous vehicle of claim 18, wherein:

the first spatial region is defined at least in part by a first distance dimension value associated with a first side of an intersection and a second distance dimension value associated with a second side of the intersection, wherein the first distance dimension value is less than or equal to the second distance dimension value; and the second spatial region is defined at least in part by a third distance dimension value associated with a first side of a conflicting lane and a fourth distance dimension value associated with a second side of a conflicting lane, wherein the first distance dimension value is less than or equal to the third distance dimension value, wherein the third distance dimension value is less than or equal to the fourth distance dimension value, and wherein the fourth distance dimension value is less than or equal to the second distance dimension value.

* * * * *